US012660040B2

(12) United States Patent
Abotabl et al.

(10) Patent No.: US 12,660,040 B2
(45) Date of Patent: Jun. 16, 2026

(54) TECHNIQUES FOR SELECTIVE TRANSMISSION OF AN ON-DEMAND SYNCHRONIZATION SIGNAL BLOCK DURING A CELL DISCONTINUOUS TRANSMISSION INACTIVE TIME

(71) Applicant: QUALCOMM Incorporated, San Diego, CA (US)

(72) Inventors: Ahmed Attia Abotabl, San Diego, CA (US); Diana Maamari, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 18/538,501

(22) Filed: Dec. 13, 2023

(65) Prior Publication Data

US 2025/0203704 A1     Jun. 19, 2025

(51) Int. Cl.
| | |
|---|---|
| *H04W 76/28* | (2018.01) |
| *H04W 52/02* | (2009.01) |
| *H04W 56/00* | (2009.01) |
| *H04W 72/0446* | (2023.01) |

(52) U.S. Cl.
CPC ....... *H04W 76/28* (2018.02); *H04W 52/0235* (2013.01); *H04W 56/0015* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2024/0244521 A1* | 7/2024 | Yi | ..................... H04W 52/0235 |
| 2025/0112715 A1* | 4/2025 | Cheng | .................. H04B 17/327 |

FOREIGN PATENT DOCUMENTS

| | | | | |
|---|---|---|---|---|
| WO | WO-2024084886 A1 * | 4/2024 | ............ | H04W 52/02 |

* cited by examiner

*Primary Examiner* — Peter P Chau
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information that configures resources associated with an on-demand synchronization signal block (SSB) that include a first occasion occurring during a cell discontinuous transmission (DTX) inactive time and a second occasion occurring during a cell DTX active time. The UE may receive an indication as to whether the UE is permitted to request the on-demand SSB to be transmitted during the cell DTX inactive time. The UE may perform, based at least in part on the indication, one of transmitting a request for a first instance of the on-demand SSB to be transmitted in the first occasion, or refraining from transmitting the request for the first instance of the on-demand SSB to be transmitted in the first occasion. Numerous other aspects are described.

20 Claims, 11 Drawing Sheets

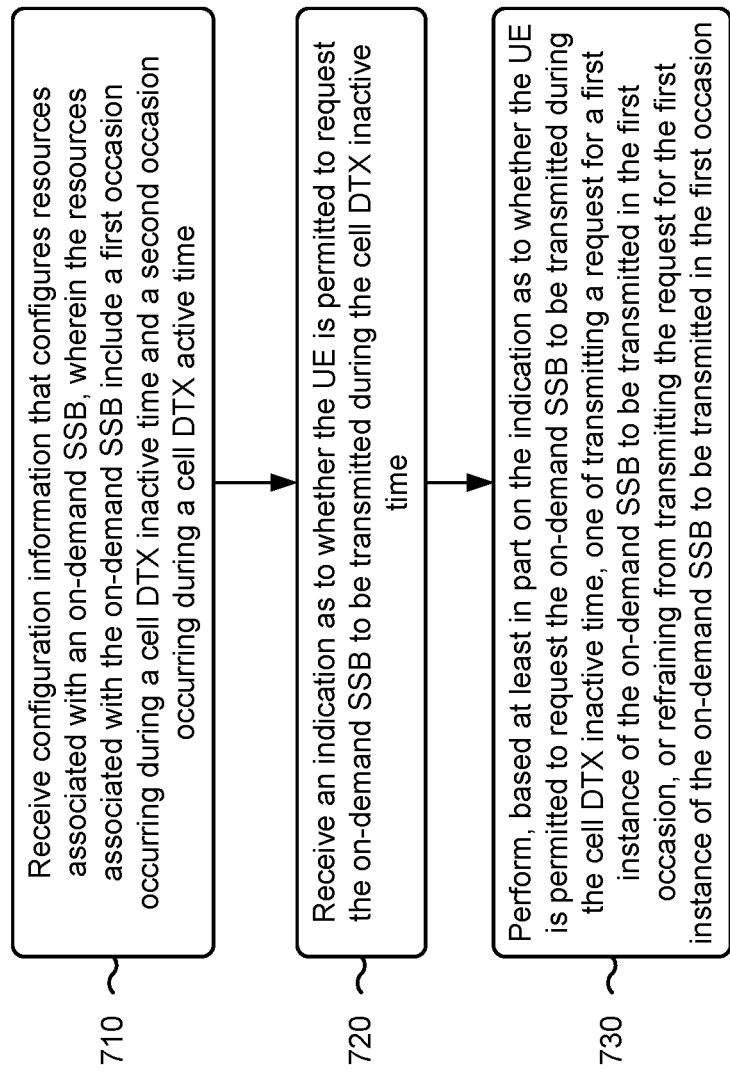

Receive configuration information that configures resources associated with an on-demand SSB, wherein the resources associated with the on-demand SSB include a first occasion occurring during a cell DTX inactive time and a second occasion occurring during a cell DTX active time

710

Receive an indication as to whether the UE is permitted to request the on-demand SSB to be transmitted during the cell DTX inactive time

720

Perform, based at least in part on the indication as to whether the UE is permitted to request the on-demand SSB to be transmitted during the cell DTX inactive time, one of transmitting a request for a first instance of the on-demand SSB to be transmitted in the first occasion, or refraining from transmitting the request for the first instance of the on-demand SSB to be transmitted in the first occasion

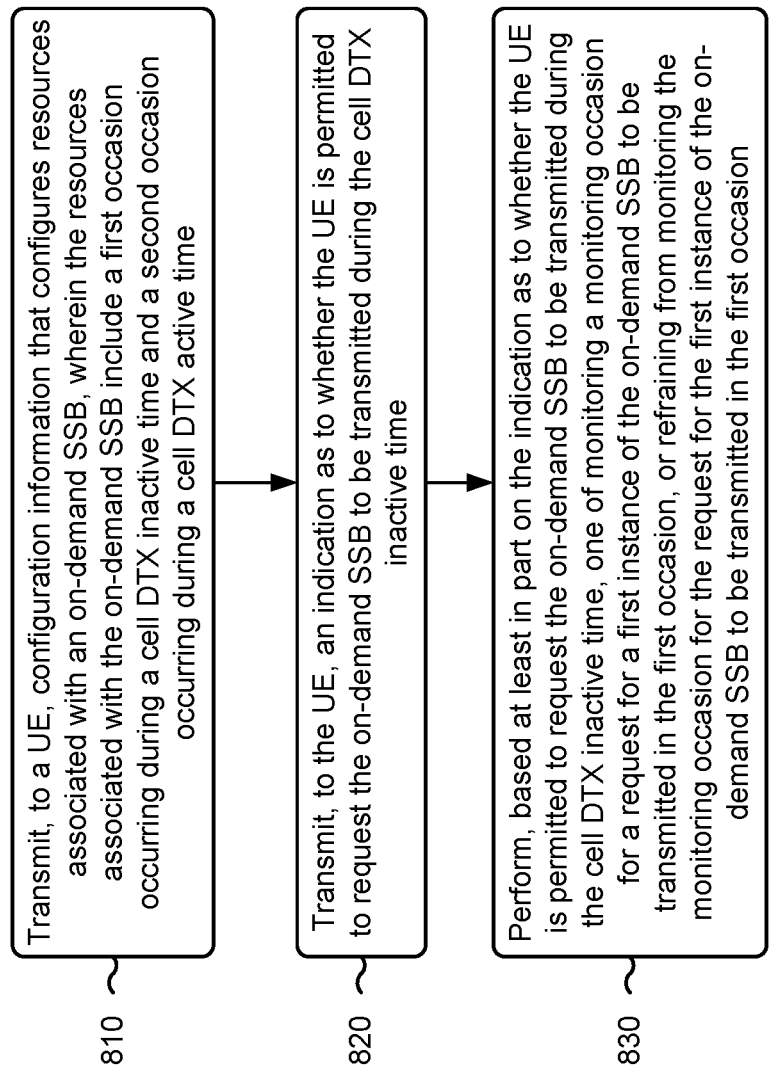

810 — Transmit, to a UE, configuration information that configures resources associated with an on-demand SSB, wherein the resources associated with the on-demand SSB include a first occasion occurring during a cell DTX inactive time and a second occasion occurring during a cell DTX active time 820 — Transmit, to the UE, an indication as to whether the UE is permitted to request the on-demand SSB to be transmitted during the cell DTX inactive time 830 — Perform, based at least in part on the indication as to whether the UE is permitted to request the on-demand SSB to be transmitted during the cell DTX inactive time, one of monitoring a monitoring occasion for a request for a first instance of the on-demand SSB to be transmitted in the first occasion, or refraining from monitoring the monitoring occasion for the request for the first instance of the on-demand SSB to be transmitted in the first occasion

TECHNIQUES FOR SELECTIVE TRANSMISSION OF AN ON-DEMAND SYNCHRONIZATION SIGNAL BLOCK DURING A CELL DISCONTINUOUS TRANSMISSION INACTIVE TIME

FIELD OF THE DISCLOSURE

Aspects of the present disclosure generally relate to wireless communication and to techniques and apparatuses for selective transmission of an on-demand synchronization signal block during a cell discontinuous transmission inactive time.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

In some aspects, a method of wireless communication performed by a user equipment (UE) includes receiving configuration information that configures resources associated with an on-demand synchronization signal block (SSB), wherein the resources associated with the on-demand SSB include a first occasion occurring during a cell discontinuous transmission (DTX) inactive time and a second occasion occurring during a cell DTX active time; receiving an indication as to whether the UE is permitted to request the on-demand SSB to be transmitted during the cell DTX inactive time; and performing, based at least in part on the indication as to whether the UE is permitted to request the on-demand SSB to be transmitted during the cell DTX inactive time, one of: transmitting a request for a first instance of the on-demand SSB to be transmitted in the first occasion, or refraining from transmitting the request for the first instance of the on-demand SSB to be transmitted in the first occasion.

In some aspects, a method of wireless communication performed by a network node includes transmitting, to a UE, configuration information that configures resources associated with an on-demand SSB, wherein the resources associated with the on-demand SSB include a first occasion occurring during a cell DTX inactive time and a second occasion occurring during a cell DTX active time; transmitting, to the UE, an indication as to whether the UE is permitted to request the on-demand SSB to be transmitted during the cell DTX inactive time; and performing, based at least in part on the indication as to whether the UE is permitted to request the on-demand SSB to be transmitted during the cell DTX inactive time, one of: monitoring a monitoring occasion for a request for a first instance of the on-demand SSB to be transmitted in the first occasion, or refraining from monitoring the monitoring occasion for the request for the first instance of the on-demand SSB to be transmitted in the first occasion.

In some aspects, an apparatus for wireless communication at a UE includes one or more memories; and one or more processors coupled to the one or more memories, the one or more processors individually or collectively configured to cause the UE to: receive configuration information that configures resources associated with an on-demand SSB, wherein the resources associated with the on-demand SSB include a first occasion occurring during a cell DTX inactive time and a second occasion occurring during a cell DTX active time; receive an indication as to whether the UE is permitted to request the on-demand SSB to be transmitted during the cell DTX inactive time; and perform, based at least in part on the indication as to whether the UE is permitted to request the on-demand SSB to be transmitted during the cell DTX inactive time, one of: transmitting a request for a first instance of the on-demand SSB to be transmitted in the first occasion, or refrain from transmitting the request for the first instance of the on-demand SSB to be transmitted in the first occasion.

In some aspects, an apparatus for wireless communication at a network node includes one or more memories; and one or more processors, coupled to the one or more memories, configured to cause the network node to: transmit, to a UE, configuration information that configures resources associated with an on-demand SSB, wherein the resources associated with the on-demand SSB include a first occasion occurring during a cell DTX inactive time and a second occasion occurring during a cell DTX active time; transmit, to the UE, an indication as to whether the UE is permitted to request the on-demand SSB to be transmitted during the cell DTX inactive time; and perform, based at least in part on the indication as to whether the UE is permitted to request the on-demand SSB to be transmitted during the cell DTX inactive time, one of: monitoring a monitoring occasion for a request for a first instance of the on-demand SSB to be transmitted in the first occasion, or refrain from monitoring the monitoring occasion for the request for the first instance of the on-demand SSB to be transmitted in the first occasion.

In some aspects, a non-transitory computer-readable medium storing a set of instructions for wireless communication includes one or more instructions that, when executed by one or more processors of a UE, cause the UE to: receive configuration information that configures resources associated with an on-demand SSB, wherein the resources associated with the on-demand SSB include a first occasion occurring during a cell DTX inactive time and a second occasion occurring during a cell DTX active time; receive an indication as to whether the UE is permitted to request the on-demand SSB to be transmitted during the cell DTX inactive time; and perform, based at least in part on the indication as to whether the UE is permitted to request the on-demand SSB to be transmitted during the cell DTX inactive time, one of: transmit a request for a first instance of the on-demand SSB to be transmitted in the first occasion, or refrain from transmitting the request for the first instance of the on-demand SSB to be transmitted in the first occasion.

In some aspects, a non-transitory computer-readable medium storing a set of instructions for wireless communication includes one or more instructions that, when executed by one or more processors of a network node, cause the network node to: transmit, to a UE, configuration information that configures resources associated with an on-demand SSB, wherein the resources associated with the on-demand SSB include a first occasion occurring during a cell DTX inactive time and a second occasion occurring during a cell DTX active time; transmit, to the UE, an indication as to whether the UE is permitted to request the on-demand SSB to be transmitted during the cell DTX inactive time; and perform, based at least in part on the indication as to whether the UE is permitted to request the on-demand SSB to be transmitted during the cell DTX inactive time, one of: monitor a monitoring occasion for a request for a first instance of the on-demand SSB to be transmitted in the first occasion, or refrain from monitoring the monitoring occasion for the request for the first instance of the on-demand SSB to be transmitted in the first occasion.

In some aspects, an apparatus for wireless communication includes means for receiving configuration information that configures resources associated with an on-demand SSB, wherein the resources associated with the on-demand SSB include a first occasion occurring during a cell DTX inactive time and a second occasion occurring during a cell DTX active time; means for receiving an indication as to whether the apparatus is permitted to request the on-demand SSB to be transmitted during the cell DTX inactive time; and means for performing, based at least in part on the indication as to whether the apparatus is permitted to request the on-demand SSB to be transmitted during the cell DTX inactive time, one of: means for transmitting a request for a first instance of the on-demand SSB to be transmitted in the first occasion, or means for refraining from transmitting the request for the first instance of the on-demand SSB to be transmitted in the first occasion.

In some aspects, an apparatus for wireless communication includes means for transmitting, to a UE, configuration information that configures resources associated with an on-demand SSB, wherein the resources associated with the on-demand SSB include a first occasion occurring during a cell DTX inactive time and a second occasion occurring during a cell DTX active time; means for transmitting, to the UE, an indication as to whether the UE is permitted to request the on-demand SSB to be transmitted during the cell DTX inactive time; and means for performing, based at least in part on the indication as to whether the UE is permitted to request the on-demand SSB to be transmitted during the cell DTX inactive time, one of: means for monitoring a monitoring occasion for a request for a first instance of the on-demand SSB to be transmitted in the first occasion, or means for refraining from monitoring the monitoring occasion for the request for the first instance of the on-demand SSB to be transmitted in the first occasion.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, at a UE or an apparatus of a UE, in accordance with the present disclosure.

FIG. 8 is a diagram illustrating an example process performed, for example, at a network node or an apparatus of a network node, in accordance with the present disclosure.

DETAILED DESCRIPTION

Figure 1:
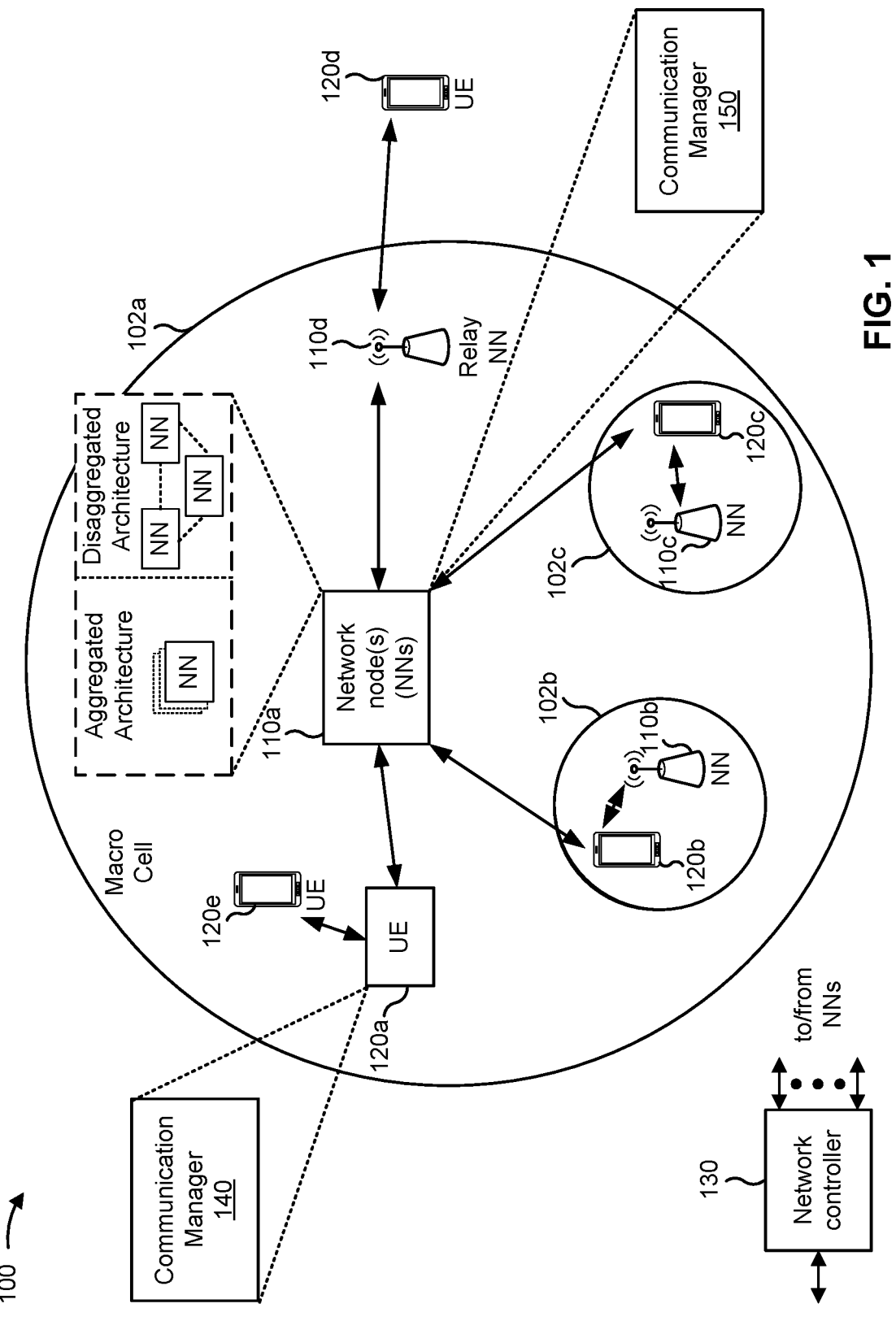
FIG. 1 is a diagram illustrating an example of a wireless network.

In some examples, a user equipment (UE) may be configured, by a network node, with a cell discontinuous transmission (DTX) configuration, which may indicate a cell DTX active time and/or a cell DTX inactive time. Moreover, a UE 120 may be configured to request and/or receive a discovery reference signal (DRS) and/or an on-demand synchronization signal block (SSB). A DRS may be a simplified SSB used for a purpose of radio resource management (RRM) measurement. An on-demand SSB may be an SSB that is transmitted by the network node in response to a request from the UE and/or an SSB that is used for time and/or frequency synchronization and multi-beam operation.

In some instances, an on-demand SSB requested by a UE from a network node may overlap with the cell DTX inactive time. This may result in communication errors between the UE and the network node. This may be because during a cell DTX inactive time the network node may have limitations as to what signals and/or channels may be transmitted, and thus the network node may refrain from transmitting the requested on-demand SSB. This may result in degraded communication channels, increased communication errors, and increased power, computing, and network resource consumption for correcting communication errors.

Some techniques and aspects described herein enable selective transmission of an on-demand SSB during a cell DTX inactive time. In some aspects, a network node may transmit, to a UE, a cell DTX configuration and/or a configuration of on-demand SSB resources that include occasions occurring during both a cell DTX inactive time and a cell DTX active time. The network node may further indicate whether the UE is permitted to request an on-demand SSB to be transmitted during the cell DTX inactive time (e.g., whether the UE is permitted to request an on-demand SSB to be transmitted using an occasion occurring during the cell DTX inactive time). Based at least in part on the indication, the UE may selectively perform one of transmitting a request for a first instance of the on-demand SSB to be transmitted in an occasion occurring during the cell DTX inactive time, or refraining from transmitting the request for the first instance of the on-demand SSB to be transmitted in an occasion occurring during the cell DTX inactive time.

By the network node indicating to the UE whether an on-demand SSB is permitted to be requested during the cell DTX inactive time and/or by the UE selectively transmitting or refraining from transmitting the request for the on-demand SSB to be transmitted during the cell DTX inactive time, the network node and the UE may establish a robust and predictable synchronization procedure, thereby improving communication channels between the network node and the UE. Improving communication channels between the network node and the UE may result in reduced communication errors and thus reduced power, computing, and network resource consumption otherwise required to correct communication errors.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, an unmanned aerial vehicle, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive configuration information that configures resources associated with an on-demand SSB, wherein the resources associated with the on-demand SSB include a first occasion occurring during a cell DTX inactive time and a second occasion occurring during a cell DTX active time; receive an indication as to whether the UE is permitted to request the on-demand SSB to be transmitted during the cell DTX inactive time; and perform, based at least in part on the indication as to whether the UE is permitted to request the on-demand SSB to be transmitted during the cell DTX inactive time, one of: transmit a request for a first instance of the on-demand SSB to be transmitted in the first occasion, or refrain from transmitting the request for the first instance of the on-demand SSB to be transmitted in the first occasion. Additionally, or alternatively, the communication manager 140 may perform one or more other operations described herein.

In some aspects, the network node 110 may include a communication manager 150. As described in more detail elsewhere herein, the communication manager 150 may transmit, to a UE, configuration information that configures resources associated with an on-demand SSB, wherein the resources associated with the on-demand SSB include a first occasion occurring during a cell DTX inactive time and a second occasion occurring during a cell DTX active time; transmit, to the UE, an indication as to whether the UE is permitted to request the on-demand SSB to be transmitted during the cell DTX inactive time; and perform, based at least in part on the indication as to whether the UE is permitted to request the on-demand SSB to be transmitted during the cell DTX inactive time, one of: monitor a monitoring occasion for a request for a first instance of the on-demand SSB to be transmitted in the first occasion, or refrain from monitoring the monitoring occasion for the request for the first instance of the on-demand SSB to be transmitted in the first occasion. Additionally, or alternatively, the communication manager 150 may perform one or more other operations described herein.

As indicated above, FIG. 1 is provided as an example. Other examples may differ from what is described with regard to FIG. 1.

Figure 2:
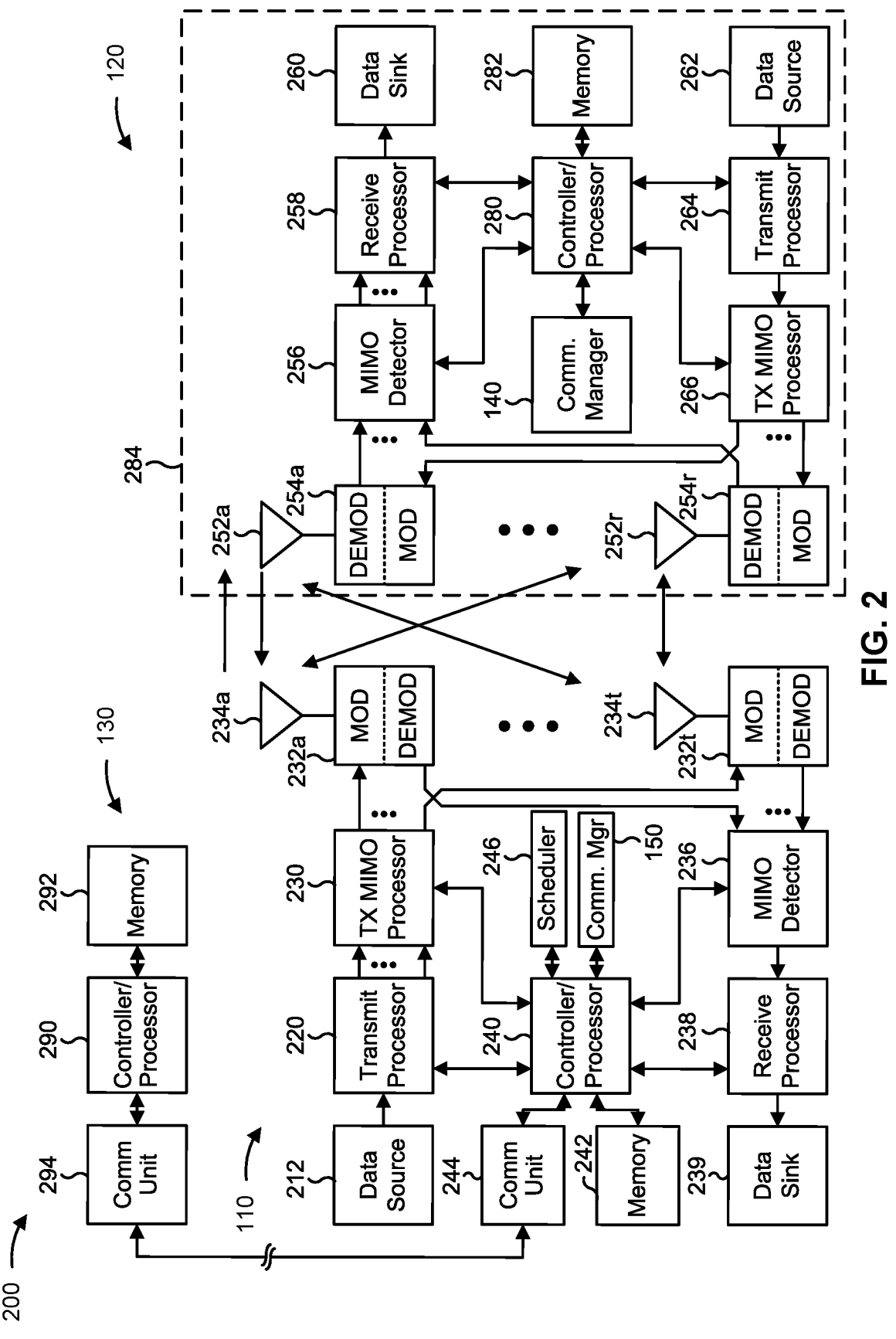
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 6A-10).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 6A-10).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or sub-components of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with selective transmission of an on-demand synchronization signal block during a cell discontinuous transmission inactive time, as described in more detail elsewhere herein. For example, the controller/processor 240 of the network node 110, the controller/processor 280 of the UE 120, or any other component(s) (or combinations of components) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving configuration information that configures resources associated with an on-demand SSB, wherein the resources associated with the on-demand SSB include a first occasion occurring during a cell DTX inactive time and a second occasion occurring during a cell DTX active time; means for receiving an indication as to whether the UE is permitted to request the on-demand SSB to be transmitted during the cell DTX inactive time; and/or means for performing, based at least in part on the indication as to whether the UE is permitted to request the on-demand SSB to be transmitted during the cell DTX inactive time, one of: means for transmitting a request for a first instance of the on-demand SSB to be transmitted in the first occasion, or means for refraining from transmitting the request for the first instance of the on-demand SSB to be transmitted in the first occasion. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, configuration information that configures resources associated with an on-demand SSB, wherein the resources associated with the on-demand SSB include a first occasion occurring during a cell DTX inactive time and a second occasion occurring during a cell DTX active time; means for transmitting, to the UE, an indication as to whether the UE is permitted to request the on-demand SSB to be transmitted during the cell DTX inactive time; and/or means for performing, based at least in part on the indication as to whether the UE is permitted to request the on-demand SSB to be transmitted during the cell DTX inactive time, one of: means for monitoring a monitoring occasion for a request for a first instance of the on-demand SSB to be transmitted in the first occasion, or means for refraining from monitoring the monitoring occasion for the request for the first instance of the on-demand SSB to be transmitted in the first occasion. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
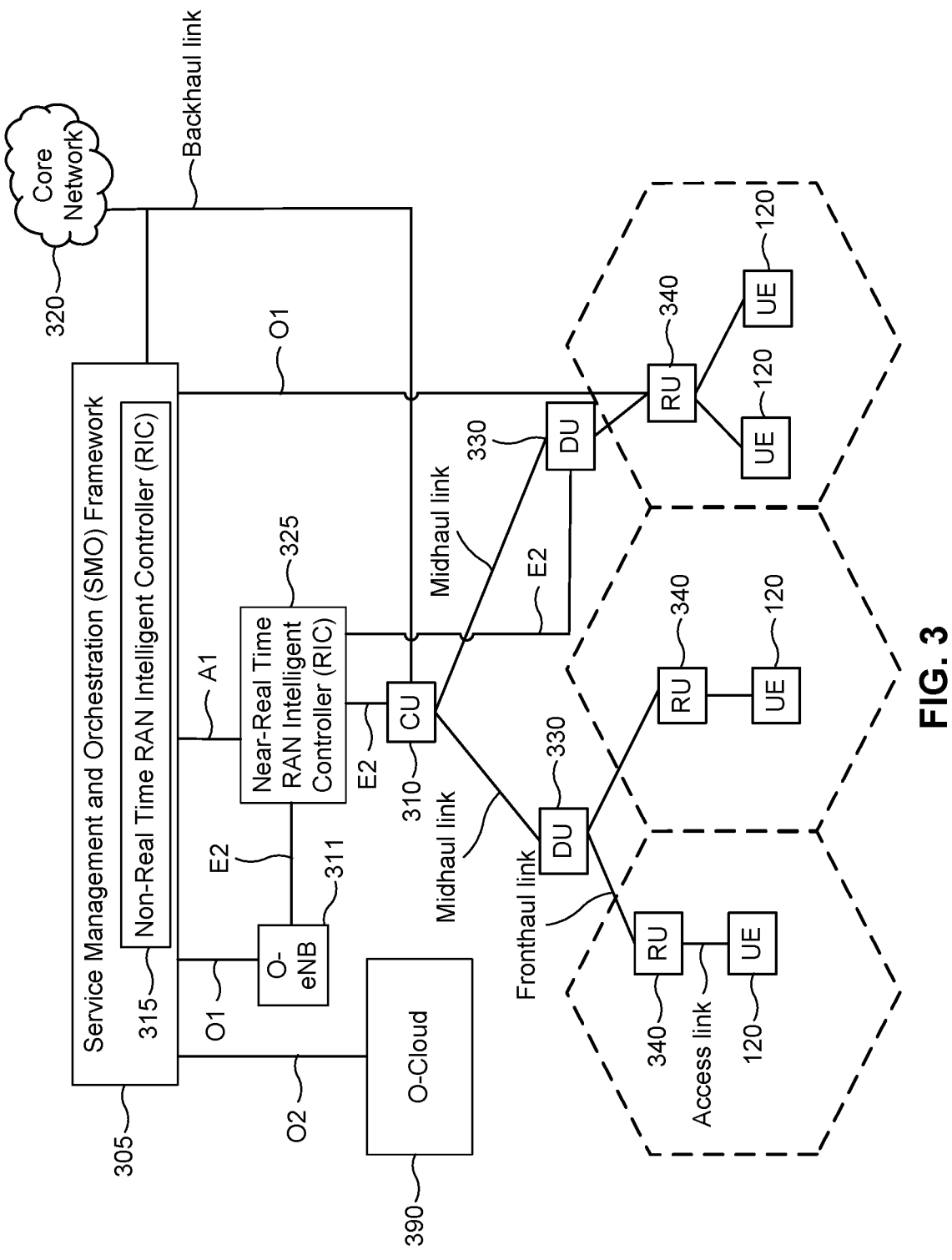
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
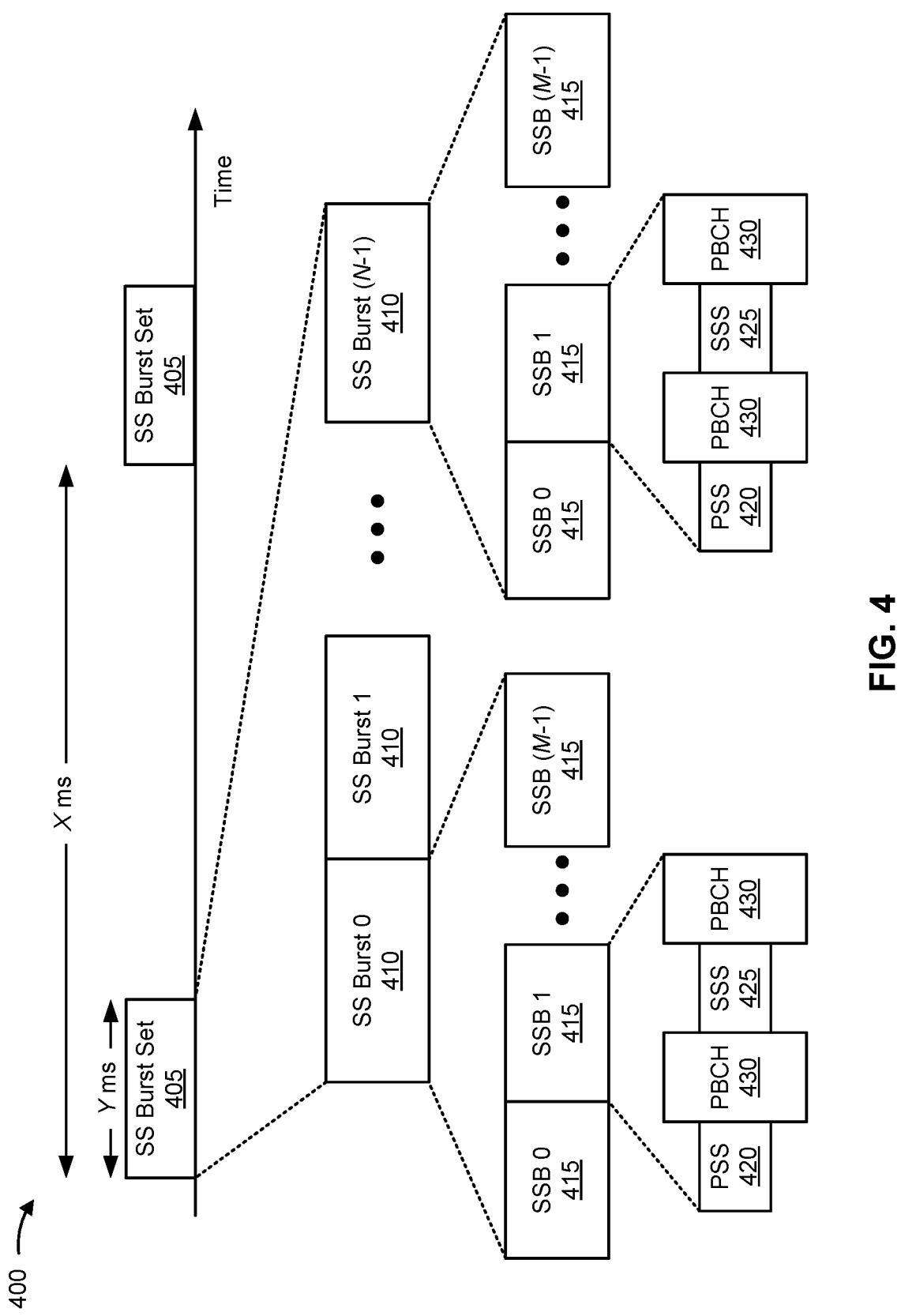
FIG. 4 is a diagram illustrating an example of a synchronization signal hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by one or more network nodes. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., a network node 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a primary synchronization signal (PSS) 420, a secondary synchronization signal (SSS) 425, and/or a physical broadcast channel (PBCH) 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., a network node 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., a reference signal received power (RSRP) parameter) to a network node 110 (e.g., directly or via one or more other network nodes). The network node 110 and the UE 120 may use the one or more indicated SSBs 415 to select one or more beams to be used for communication between the network node 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

In some examples, a network node 110 may be associated with a massive-MIMO active antenna unit (AAU) to receive and/or to transmit signals (e.g., one or more of the reference signals described above), such as a massive-MIMO AAU that includes multiple, co-located panels consisting of multiple antenna ports. Each panel may be equipped with numerous power amplifiers and antenna subsystems, which consume large amounts of power. For example, more than 20% of all expenses associated with a wireless network may be attributed to energy costs necessary to operate the wireless network and, of those energy costs, over 50% may be attributed to radio access network (RAN) energy costs. Thus, network energy savings may be important for adoption and expansion of cellular networks.

In some examples, in order to reduce energy consumption by network components (e.g., network nodes 110 and/or other components) and/or for a similar purpose, a network node 110 may be configured to power down during periods of low load, such as by operating in a DTX and/or a discontinuous reception (DRX) mode, sometimes referred to as cell DTX and/or cell DRX, respectively. Aspects of cell DTX and/or cell DRX are described in more detail below in connection with FIG. 5.

As indicated above, FIG. 4 is provided as an example. Other examples may differ from what is described with regard to FIG. 4.

Figure 5:
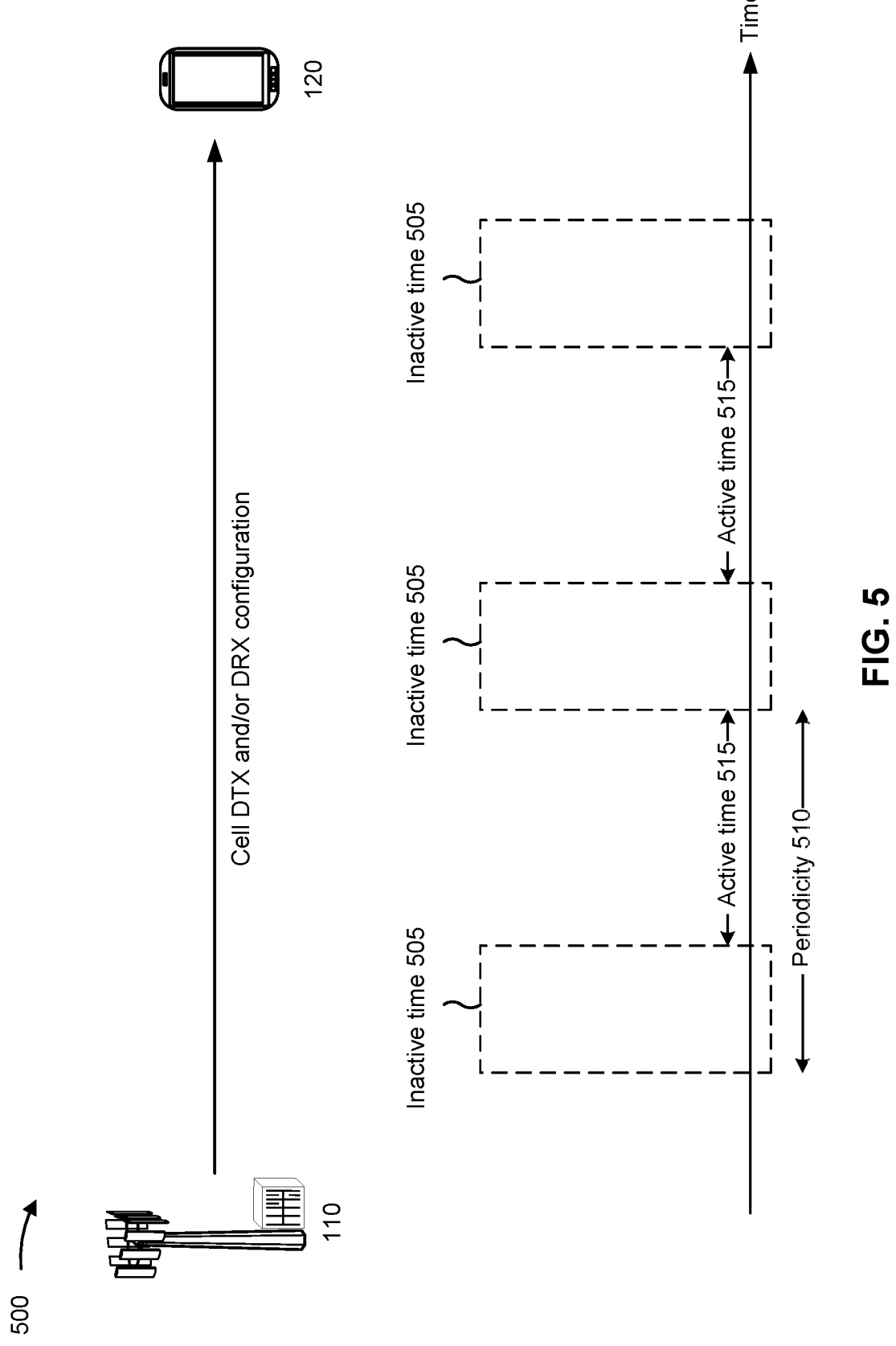
FIG. 5 is a diagram illustrating an example of cell discontinuous transmission (DTX) and/or discontinuous reception, in accordance with the present disclosure.

FIG. 5 is a diagram illustrating an example 500 of cell DTX and/or DRX, in accordance with the present disclosure. As shown in FIG. 5, example 500 includes a UE 120 in communication with a network node 110. In some examples, the UE 120 may be in a connected state (e.g., an RRC connected state) with the network node 110.

As shown, the network node 110 may transmit a cell DTX and/or DRX configuration to the UE 120 to configure a cell DTX and/or DRX cycle for the UE 120. For example, the configuration may be for cell DTX, cell DRX, or both cell DTX and cell DRX. The configuration may indicate an inactive time 505 (which may also be referred to as an "uplink and/or downlink channel restriction window") for the cycle. The configuration may indicate a starting time of the inactive time 505 (e.g., a time offset), a duration of the inactive time 505, and/or a periodicity 510 of the inactive time 505, among other examples. One or more types of physical channels or signals may be restricted during the inactive time 505 (e.g., a restricted channel or signal that is scheduled or configured during the inactive time 505 may be dropped by the network node 110 and/or the UE 120). That is, the UE 120 may be expected to not transmit or receive particular channels or signals during the inactive time 505. In this way, the network node 110 may enter a sleep state during the inactive time 505. Downlink channels or signals restricted during the inactive time 505 may include periodic and/or semi-persistent channel state information (CSI) reference signals (CSI-RSs) (e.g., including tracking reference signals (TRSs)), positioning reference signals (PRSs), physical downlink control channels (PDCCHs) scrambled with a UE-specific radio network temporary identifier (RNTI), PDCCHs in a type-3 common search space (CSS) (e.g., a group-common PDCCH), and/or semi persistent scheduling (SPS) physical downlink shared channels (PD-SCHs), among other examples. Additionally, or alternatively, uplink channels or signals restricted during the inactive time 505 may include scheduling requests, periodic and/or semi-persistent CSI reports, periodic and/or semi-persistent sounding reference signals (SRSs), and/or configured grant (CG) physical uplink shared channels (PUSCHs), among other examples. As further shown, cell DTX and/or DRX may include active times 515 outside of (e.g., between) inactive times 505. Physical channel or signal restrictions applicable to the inactive time 505 may not be applicable to the active time 515.

In some examples, during the inactive time 505, the UE 120 may be expected to drop physical channels or signals associated with a minimal impact to UE implementation complexity or system performance. For example, in downlink, the UE 120 may drop reception of a PDCCH in a type-3 CSS, an SPS communication, a CSI-RS for generating CSI, and/or a CSI-RS for propagation delay compensation, among other examples. Additionally, or alternatively, in uplink, the UE 120 may drop transmission of a scheduling request, a CG communication, and/or CSI feedback, among other examples. However, during the inactive time 505, the UE 120 may not be expected to drop physical channels or signals associated with a high impact to UE implementation complexity or system performance. For example, in downlink, the UE 120 may receive a CSI-RS for tracking (e.g., a TRS), a CSI-RS for positioning, a CSI-RS for beam management, and/or a CSI-RS for beam failure detection, among other examples. Additionally, or alternatively, in uplink, the UE 120 may transmit an SRS for positioning and/or a scheduling request, among other examples.

In some examples, in addition to configuring the UE 120 with a cell DTX and/or DRX configuration, the network node 110 and/or the UE 120 may reduce a frequency at which one or more reference signals (e.g., one or more of the reference signals described above in connection with FIG. 4) are exchanged, such as for a purpose of reducing power consumption at the network. For example, in some deployments of a wireless communication standard (e.g., some deployments of a standard promulgated by the 3GPP) and/or for some frequency ranges (e.g., FR1 and FR2), intra-band carrier aggregation (CA) with SSB-less carriers may be supported, while, in some other deployments and/or frequency ranges (e.g., FR1), inter-band CA with SSB-less carriers may be supported. Additionally, or alternatively, a UE 120 may be configured to request and/or receive a discovery reference signal (DRS) and/or an on-demand SSB, such as for a purpose of performing synchronization and/or RRM measurement tasks with reduced signaling. A DRS may be a simplified SSB used for a purpose of radio RRM measurement. An on-demand SSB may be an SSB that is transmitted by the network node 110 in response to a request from the UE 120 and/or an SSB that is used for time and/or frequency synchronization and multi-beam operation. In some examples, a DRS and/or an on-demand SSB may be used for scenarios in which CA with SSB-less carriers is not feasible and/or to extend inter-band CA with SSB-less carriers to certain frequency ranges (e.g., FR2).

In some aspects, an on-demand SSB requested by a UE 120 from a network node 110 may overlap with a cell DTX inactive time associated with the network node 110. This may result in communication errors between the UE 120 and the network node 110 because the network node 110 may have limitations as to what signals and/or channels may be transmitted by the network node 110 during the cell DTX inactive time, and thus the network node 110 may refrain from transmitting a requested on-demand SSB. Refraining from transmitting a requested on-demand SSB during a cell DTX inactive time may result in synchronization errors at the UE 120 and/or degraded communication channels, leading to increased communication errors, and thus increased power, computing, and network resource consumption for correcting communication errors. Additionally, or alternatively, a non-on-demand SSB (e.g., an SSB transmitted as specified by a wireless communication standard, sometimes referred to herein as a legacy SSB) may be required to be transmitted even during a cell DTX inactive time. Accordingly, a network node 110 that is scheduled to transmit a legacy SSB during the cell DTX inactive time, and that is not capable of transmitting the legacy SSB while in a sleep mode, may need to switch to an active mode to transmit a legacy SSB, thereby preventing the network node 110 from entering a deep sleep and/or otherwise fully realizing a full potential of power savings achievable by a cell DTX configuration.

Some techniques and aspects described herein enable selective transmission of an on-demand SSB during a cell DTX inactive time. In some aspects, a network node 110 may transmit, to a UE 120, a configuration of on-demand SSB resources and/or a cell DTX configuration, with the on-demand SSB resources including occasions occurring during both a cell DTX inactive time and a cell DTX active time. The network node 110 may further indicate whether the UE 120 is permitted to request an on-demand SSB to be transmitted during the cell DTX inactive time (e.g., whether the UE 120 is permitted to request an on-demand SSB to be transmitted using the occasions of the on-demand SSB resources that occur during the cell DTX inactive time). Based at least in part on the indication, the UE 120 may selectively perform one of transmitting a request for a first instance of the on-demand SSB to be transmitted in an occasion occurring during the cell DTX inactive time, or refraining from transmitting the request for the first instance of the on-demand SSB to be transmitted in an occasion occurring during the cell DTX inactive time. By the network node 110 indicating to the UE 120 whether an on-demand SSB is permitted to be requested during the cell DTX inactive time and/or by the UE 120 selectively transmitting or refraining from transmitting the request for the on-demand SSB to be transmitted during the cell DTX inactive time, synchronization errors may be reduced and/or communication channels between the network node 110 and the UE 120 may be improved, thus reducing power, computing, and network resource consumption otherwise required to correct communication errors, and/or the network node 110 may be capable of entering a deep sleep mode, thereby conserving power, computing, and network resources otherwise required to transmit a legacy SSB and/or on-demand SSB during a configured cell DTX inactive time.

As indicated above, FIG. 5 is provided as an example. Other examples may differ from what is described with regard to FIG. 5.

Figure 6A:
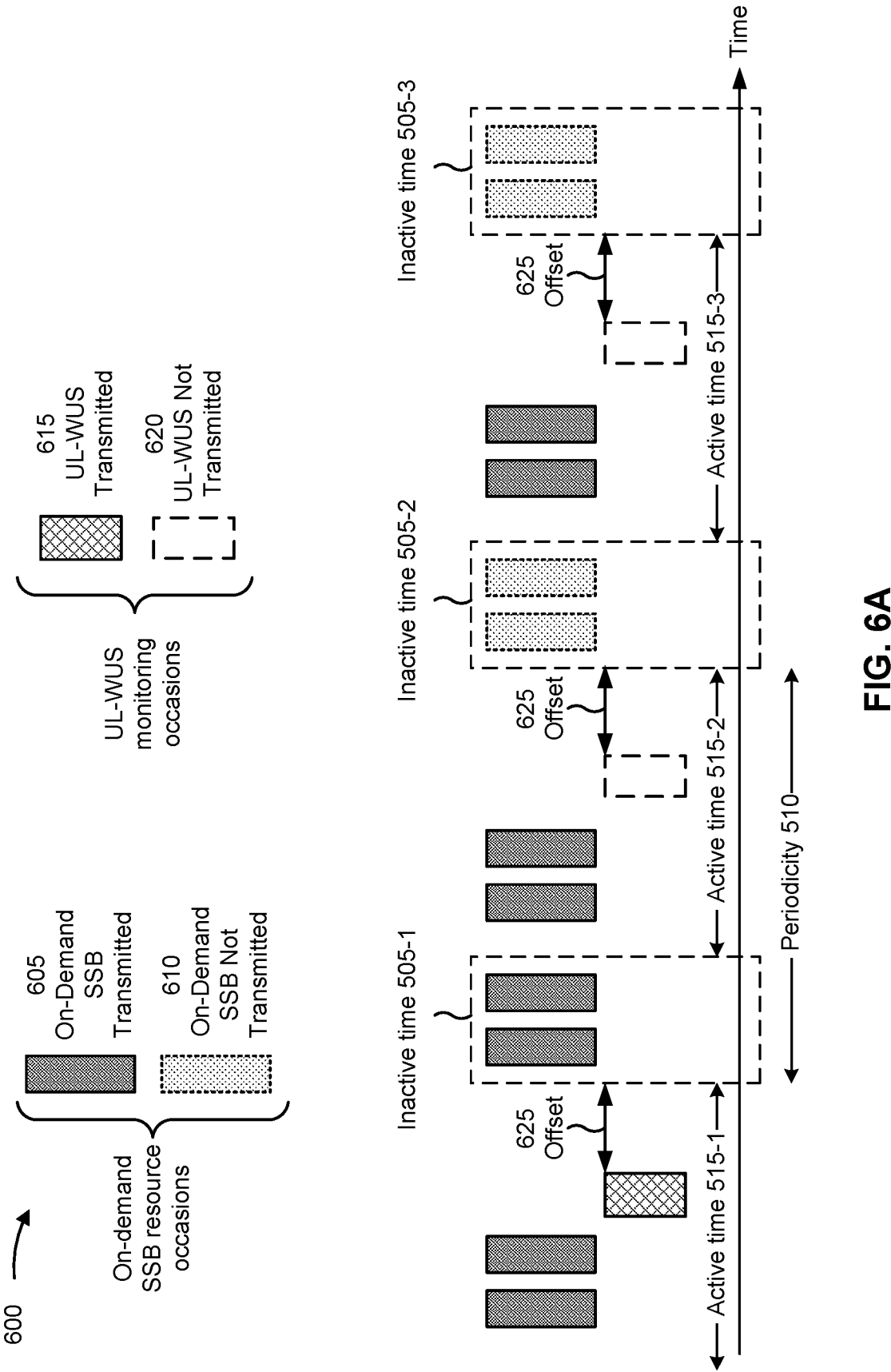
FIGS. 6A-6B are diagrams of an example associated with selective transmission of an on-demand synchronization signal block (SSB) during a cell DTX inactive time, in accordance with the present disclosure.
Figure 6B:
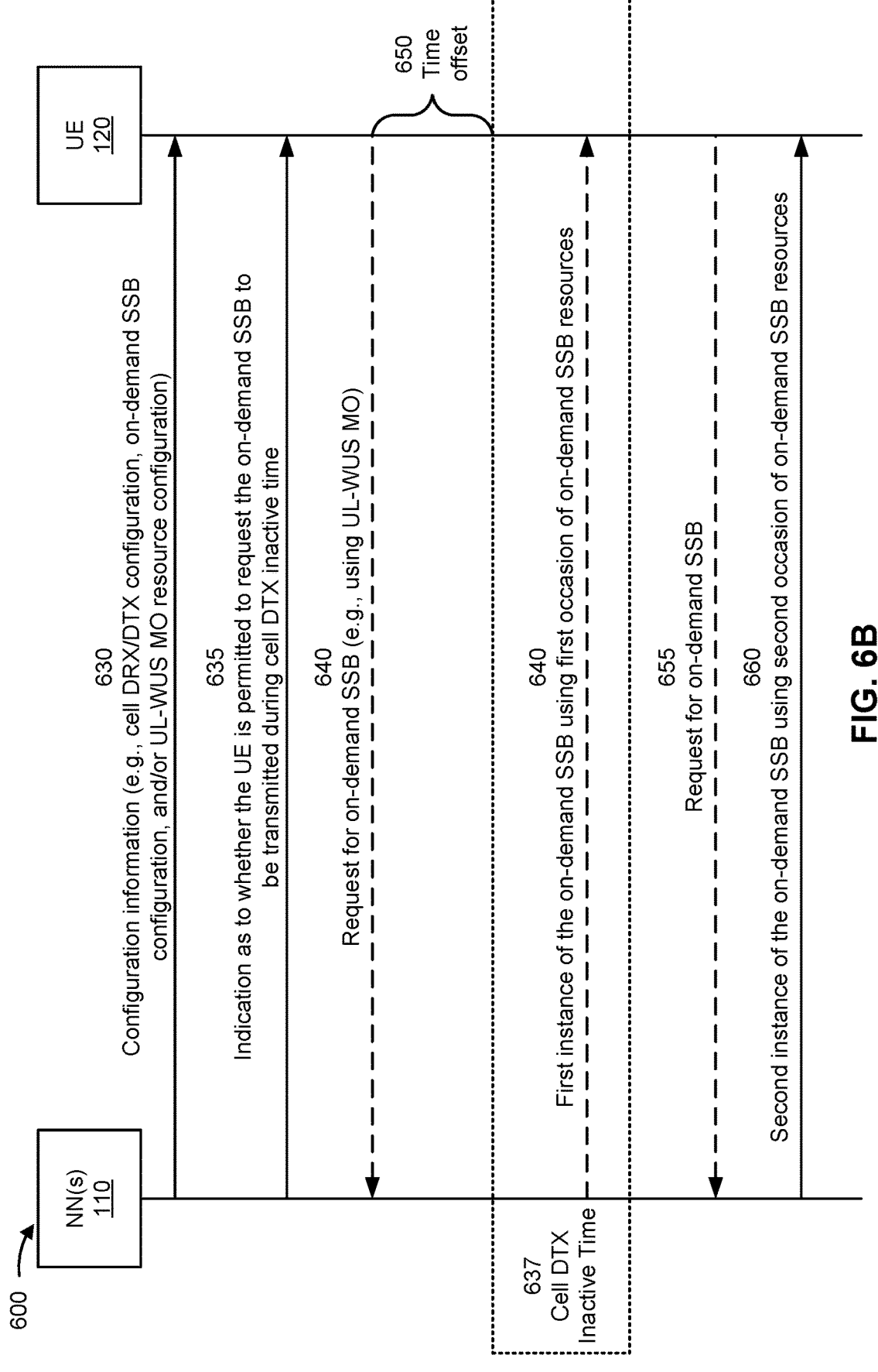

FIGS. 6A-6B are diagrams of an example 600 associated with selective transmission of an on-demand SSB during a cell DTX inactive time, in accordance with the present disclosure. In the operations shown in FIGS. 6A and 6B, a network node 110 (e.g., a CU, a DU, and/or an RU) may communicate with a UE 120. In some aspects, the network node 110 and the UE 120 may be part of a wireless network (e.g., wireless network 100). The UE 120 and the network node 110 may have established a wireless connection prior to operations shown in FIGS. 6A and 6B. In some aspects, the UE 120 and/or the network node 110 may have a capability to communicate using an on-demand SSB. For example, the UE 120 may have a capability to request an on-demand SSB and/or the network node 110 may have a capability to transmit an on-demand SSB (e.g., in response to the UE 120 requesting the on-demand SSB). Additionally, or alternatively, the network node 110 may be capable of entering a reduced-power mode (e.g., in accordance with a DRX and/or DTX configuration), such as for a purpose of conserving power during periods of low network activity.

More particularly, as shown in FIG. 6A, and as described above in connection with FIG. 5, the network node 110 may transmit a configuration to the UE 120 for cell DTX, cell DRX, or both cell DTX and cell DRX. The configuration may indicate the inactive time 505 of the DTX and/or DRX configuration (with three instances of the inactive time 505 being shown in FIG. 6A, shown as inactive time 505-1 through inactive time 505-3), the starting time of the inactive time 505, the duration of the inactive time 505, the periodicity 510 of the inactive time 505, and/or the active time 515 of the DTX and/or DRX configuration (with three instances of the active time 515 being shown in FIG. 6A, shown as active time 515-1 through active time 515-3), among other examples. In some aspects, the UE 120 may be configured to request, and the network node 110 may be capable of transmitting, an on-demand SSB, as described above. However, in some aspects, whether a UE 120 is permitted to request an on-demand SSB and/or whether the network node 110 transmits an on-demand SSB may depend on whether a resource occasion associated with an on-demand SSB falls within a cell DTX inactive time (e.g., inactive time 505) or within a cell DTX active time (e.g., active time 515).

In some aspects, as indicated by reference number 605, the network node 110 may transmit an on-demand SSB for some on-demand SSB resource occasions, and, as indicated by reference number 610, the network node 110 may refrain from transmitting an on-demand SSB for some other on-demand SSB resource occasions. For example, if an on-demand SSB resource occasion occurs within the cell DTX active time (e.g., active time 515), the network node 110 may assume that one or more UEs are requesting the on-demand SSB and/or the network node 110 may transmit the on-demand SSB even absent a request from the UE 120 (and/or any other UEs). Accordingly, in such aspects, the UE 120 may refrain from requesting on-demand SSBs that are to be transmitted during cell DTX active time, thereby reducing signaling overhead otherwise associated with requesting on-demand SSBs. In some other aspects, all on-demand SSBs (e.g., on-demand SSBs occurring during cell DTX active time and, if permitted, on-demand SSBs occurring during cell DTX inactive time) may be transmitted only in response to the network node 110 receiving a corresponding request from the UE 120 for the on-demand SSB. In such aspects, a network node 110 may not automatically assume that one or more UEs are requesting on-demand SSBs during the cell DTX active time, and/or the network node 110 may refrain from transmitting the on-demand SSBs unless a request is received from the UE 120 (and/or any other UEs). This may result in reduced overhead and/or more efficient usage of network resources as compared to aspects in which the on-demand SSB is always transmitted during the cell DTX active time, because the network node 110 may refrain from transmitting an on-demand SSB when the on-demand SSB is not necessary and/or is not requested by any UEs.

In some aspects, a relationship between a request for an on-demand SSB and a transmitted on-demand SSB may be different for on-demand SSB resource occasions occurring during cell DTX inactive time and on-demand SSB resource occasions occurring during cell DTX active time. For example, as indicated by reference numbers 615 and 620, the network node 110 may configure the UE 120 with resources associated with a set of uplink wakeup signal (UL-WUS) monitoring occasions associated with the on-demand SSB resource occasions (more particularly, on-demand SSB resource occasions occurring during the cell DTX inactive time). A UL-WUS monitoring occasion may correspond to resources that are reserved for the UE 120 to transmit, to the network node, a UL-WUS, such as for a purpose of indicating to the network node 110 that the UE 120 needs to communicate with the network node 110 and thus indicating that the network node 110 should wake up from a power-saving mode in order to communicate with the UE 120. In such aspects, a UL-WUS monitoring occasion may be configured outside of the cell DTX inactive time (e.g., outside of the inactive time 505) and/or the UE 120 may be configured to transmit a UL-WUS outside of the cell DTX inactive time (e.g., during the active time 515) in order to request an on-demand SSB to be transmitted during the cell DTX inactive time. In some other aspects, the UE 120 may be configured with random access occasions (ROs) associated with the on-demand SSBs that may be activated for a similar purpose as described herein in connection with the UL-WUS monitoring occasions.

In the aspects shown in FIG. 6A, the UE 120 may be configured with three UL-WUS monitoring occasions, with a first UL-WUS monitoring occasion occurring during the first active time 515-1 and associated with the first inactive time 505-1, a second UL-WUS monitoring occasion occurring during the second active time 515-2 and associated with the second inactive time 505-2, and a third UL-WUS monitoring occasion occurring during the third active time 515-3 and associated with the third inactive time 505-3. As indicated using cross-hatching in the first UL-WUS monitoring occasion (e.g., the UL-WUS monitoring occasion associated with the first active time 515-1), the UE 120 may transmit, to the network node 110, a UL-WUS and/or a request for an on-demand SSB using the first UL-WUS monitoring occasion. Accordingly, as shown using dark stippling in the on-demand SSB resource occasions associated with the first inactive time 505-1, the network node 110 may transmit the on-demand SSB during the first inactive time 505-1 (e.g., the network node 110 may wake up from a deep sleep and/or otherwise activate certain functionality that is normally inactive during the cell DTX inactive time in order to transmit the on-demand SSB).

However, as indicated using no shading in the second and third UL-WUS monitoring occasions (e.g., the UL-WUS monitoring occasions associated with the second active time 515-2 and the third active time 515-3, respectively), the UE 120 may refrain from transmitting a UL-WUS and/or a request for an on-demand SSB using the second and third UL-WUS monitoring occasions. Accordingly, as shown using light stippling in the on-demand SSB resource occasions associated with the second inactive time 505-2 and the third inactive time 505-3, the network node 110 may refrain from transmitting the on-demand SSB during the second inactive time 505-2 and the third inactive time 505-3 (e.g., the network node 110 may remain in a deep sleep and/or otherwise maintain certain functionality in an inactive state). In this way, the network node 110 and/or the UE 120 may conserve power and/or signaling overhead by remaining in a deep sleep state and/or refraining from transmitting an on-demand SSB when not needed by the UE 120, while maintaining robust communication channels by enabling the UE 120 to request an on-demand SSB, even during a cell DTX inactive time, when necessary for synchronization or similar purposes.

In some aspects, the network node 110 may configure the UE 120 with a UL-WUS monitoring occasion by configuring a time offset 625 (also referred to as SSBondemand-_Offset) for locating the UL-WUS monitoring occasions. As shown in FIG. 6A, in some aspects, the time offset 625 may correspond to a period of time between a UL-WUS monitoring occasion and a start of a cell DTX inactive time corresponding to the UL-WUS monitoring occasion. In some other aspects, the time offset 625 may correspond to a period of time between a UL-WUS monitoring occasion and a corresponding SSB resource occasion. In such aspects, the time offset 625 may provide a period of time for the network node 110 to process a request for an on-demand SSB that is received in the UL-WUS monitoring occasion and/or for the network node 110 to transmit the on-demand SSB, thereby reducing the probability of missed communications (e.g., missed SSB communications) and thus reducing the probability of communication errors between the network node 110 and the UE 120.

In some aspects, certain parameters associated with an on-demand SSB transmitted during the cell DTX inactive time (e.g., an on-demand SSB shown in connection with the first inactive time 505-1) may differ from corresponding parameters associated with an on-demand SSB transmitted during the cell active time (e.g., an on-demand SSB shown in connection with the first active time 515-1, the second active time 515-2, and/or the third active time 515-3). Additionally, or alternatively, certain parameters associated with an on-demand SSB for which a request is received during a cell DTX inactive time may differ from corresponding parameters associated with an on-demand SSB for which a request is received during a cell DTX active time. For example, a less-resource-intensive on-demand SSB (also referred to as a light on-demand SSB) may be transmitted during the cell DTX inactive time and/or for requests received during the cell DTX inactive time, such as for a purpose of reducing a time during which the network node 110 needs to wake up from a deep sleep in order to transmit the on-demand SSB and/or reducing a power consumption associated with transmitting the on-demand SSB during the cell DTX inactive time, thereby preserving some of the power savings traditionally associated with the network node 110 entering a deep-sleep mode during the cell DTX inactive time.

For example, a time domain resource allocation (TDRA) associated with on-demand SSBs transmitted during the cell DTX inactive time may differ from a TDRA associated with on-demand SSBs transmitted during the cell DTX active time (e.g., a less resource-intensive TDRA may be associated with on-demand SSBs transmitted during a cell DTX inactive time than a TDRA associated with on-demand SSBs transmitted during a cell DTX active time). Additionally, or alternatively, a periodicity associated with on-demand SSBs transmitted during the cell DTX inactive time may differ from a periodicity associated with on-demand SSBs transmitted during the cell DTX active time (e.g., a periodicity of the on-demand SSBs transmitted during the cell DTX inactive time may be greater than a periodicity of the on-demand SSBs transmitted during the cell DTX active time). Additionally, or alternatively, a structure of on-demand SSBs transmitted during the cell DTX inactive time may differ from a structure of on-demand SSBs transmitted during the cell DTX active time (e.g., the on-demand SSBs transmitted during the cell DTX inactive time may include fewer symbols and/or physical resource blocks (PRBs) than the symbols and/or PRBs associated with on-demand SSBs transmitted during the cell DTX active time). Additionally, or alternatively, a transmit power level associated with on-demand SSBs transmitted during the cell DTX inactive time may differ from a transmit power level associated with on-demand SSBs transmitted during the cell DTX active time (e.g., a transmit power level associated with the on-demand SSBs transmitted during the cell DTX inactive time may be lower than a transmit power level associated with the on-demand SSBs transmitted during the cell DTX active time). Additionally, or alternatively, a number of supported beams per burst associated with on-demand SSBs transmitted during the cell DTX inactive time may differ from a number of supported beams per burst associated with on-demand SSBs transmitted during the cell DTX active time (e.g., a number of supported beams per burst associated with the on-demand SSBs transmitted during the cell DTX inactive time may be less than a number of supported beams per burst associated with the on-demand SSBs transmitted during the cell DTX active time).

Certain signaling which may be used to enable selective transmission of an on-demand SSB during a cell DTX inactive time (e.g., to enable one or more of the operations described above in connection with FIG. 6A) is further shown in FIG. 6B. As shown by reference number 630, the network node 110 may transmit, and the UE 120 may receive, configuration information. In some aspects, the UE 120 may receive the configuration information via one or more of system information (e.g., a master information block (MIB) and/or a system information block (SIB), among other examples), RRC signaling, one or more MAC control elements (MAC-CEs), and/or downlink control information (DCI), among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC-CEs and/or one or more DCI messages, among other examples.

In some aspects, the configuration information may be based at least in part on a capability of the UE 120. For example, the UE 120 may transmit, and the network node 110 may receive, a capabilities report. The capabilities report may indicate whether the UE 120 supports a feature and/or one or more parameters related to the feature. For example, the capability information may indicate a capability and/or parameter for requesting and/or receiving on-demand SSBs. As another example, the capabilities report may indicate a capability and/or parameter for transmitting a UL-WUS. One or more operations described herein may be based on capability information of the capabilities report. For example, the UE 120 may perform a communication in accordance with the capability information, or may receive configuration information that is in accordance with the capability information. In some aspects, the capabilities report may indicate UE 120 support for selectively transmitting or refraining from transmitting requests for on-demand SSBs based at least in part on a cell DRX configuration and/or a cell DTX configuration.

In some aspects, the configuration information and/or the capabilities report may include information transmitted via multiple communications. Additionally, or alternatively, the network node 110 may transmit the configuration information, or a communication including at least a portion of the configuration information, before and/or after the UE 120 transmits the capabilities report. For example, the network node 110 may transmit a first portion of the configuration information before the capabilities report, the UE 120 may transmit at least a portion of the capabilities report, and the network node 110 may transmit a second portion of the configuration information after receiving the capabilities report.

In some aspects, the configuration information may configure resources associated with an on-demand SSB. For example, the configuration information may configure resources for receiving an on-demand SSB (sometimes referred to herein as on-demand SSB resources). Additionally, or alternatively, the configuration information may include a cell DTX configuration and/or a cell DRX configuration. For example, the configuration information may indicate a cell DTX inactive time (e.g., a period and/or duration of time during which the network node 110 is to operate in a sleep state and/or a reduced-activity state, such as the inactive time 505 described above in connection with FIGS. 5 and 6A), and/or a cell DTX active time (e.g., a period and/or duration of time during which the network node 110 is to operate in a normal state, such as the active time 515 described above in connection with FIGS. 5 and 6A). In some aspects, the resources associated with the on-demand SSB may include at least a first occasion occurring during the cell DTX inactive time and a second occasion occurring during the cell DTX active time.

Additionally, or alternatively, the configuration information may further configure resources associated with a UL-WUS monitoring occasion. For example, the configuration information may configure resources associated with a UL-WUS associated with the cell DTX inactive time, such that the UE 120 may provide a request for an on-demand SSB to be transmitted during the cell DTX inactive time, as described above in connection with reference number 615, reference number 620, and the time offset 625, and as is described in more detail below in connection with reference number 640. In some aspects, the configuration information may indicate the resources associated with the UL-WUS monitoring occasion by indicating a time offset (e.g., time offset 625) between the first occasion (e.g., the occasion of the on-demand SSB resources associated with the DTX inactive time) and/or the DTX inactive time and the resources associated with the UL-WUS monitoring occasion, as described above in connection with the time offset 625 shown in FIG. 6A. Additionally, or alternatively, in some aspects, the configuration information may indicate that the resources associated with the UL-WUS monitoring occasion are mapped to the first occasion. Put another way, the configuration information may indicate that any request for an on-demand SSB that is transmitted using the UL-WUS monitoring occasion may be interpreted as a request from the UE 120 for an on-demand SSB to be transmitted in the first occasion (e.g., the occasion of the on-demand SSB resources occurring during the cell DTX inactive time).

The UE 120 may configure itself based at least in part on the configuration information. In some aspects, the UE 120 may be configured to perform one or more operations described herein based at least in part on the configuration information.

As indicated by reference number 635, in some aspects the network node 110 may transmit, and the UE 120 may receive, an indication as to whether the UE 120 is permitted to request the on-demand SSB to be transmitted during the cell DTX inactive time, such as during the cell DTX inactive time indicated by reference number 637 in FIG. 6B (e.g., inactive time 505). For example, the indication as to whether the UE 120 is permitted to request the on-demand SSB to be transmitted during the cell DTX inactive time may be transmitted to the UE 120 by the network node 110 via one of an MIB, an SIB, an RRC communication, a MAC-CE, a DCI communication, or a similar communication. Utilizing the indication as to whether the UE 120 is permitted to request the on-demand SSB to be transmitted during the cell DTX inactive time increases flexibility at the network node 110 by enabling the network node 110 to indicate that the UE 120 is not permitted to request the on-demand SSB to be transmitted during the cell DTX inactive time during certain times (e.g., when it is desirable to minimize power consumption at the network node 110) and to indicate that the UE 120 is permitted to request the on-demand SSB to be transmitted during the cell DTX inactive time during other times (e.g., when it is desirable to maximize synchronization between the network node 110 and the UE 120).

As indicated by reference number 640, based at least in part on the indication as to whether the UE 120 is permitted to request the on-demand SSB to be transmitted during the cell DTX inactive time, the UE 120 may perform one of transmitting a request for a first instance of the on-demand SSB to be transmitted in the first occasion, or refraining from transmitting the request for the first instance of the on-demand SSB to be transmitted in the first occasion. More particularly, in aspects in which the indication indicates that the UE 120 is permitted to request the on-demand SSB to be transmitted during the cell DTX inactive time, the UE 120 may transmit the request for the first instance of the on-demand SSB to be transmitted in the first occasion (e.g., the occasion of the on-demand SSB resources occurring during the cell DTX time). Additionally, or alternatively, in such aspects the UE 120 may be configured to transmit the request for the first instance of the on-demand SSB during the cell DTX active time, such as for a purpose of ensuring that the network node 110 receives the request for the on-demand SSB. On the other hand, in aspects in which the indication indicates that the UE 120 is not permitted to request the on-demand SSB to be transmitted during the cell DTX inactive time, the UE 120 may refrain from transmitting the request for the first instance of the on-demand SSB to be transmitted in the first occasion.

Similarly, based at least in part on the indication as to whether the UE 120 is permitted to request the on-demand SSB to be transmitted during the cell DTX inactive time, the network node 110 may perform one of monitoring a monitoring occasion for a request for a first instance of the on-demand SSB to be transmitted in the first occasion, or refraining from monitoring the monitoring occasion for the request for the first instance of the on-demand SSB to be transmitted in the first occasion. More particularly, in aspects in which the indication indicates that the UE 120 is permitted to request the on-demand SSB to be transmitted during the cell DTX inactive time, the network node 110 may monitor the monitoring occasion for the request for the first instance of the on-demand SSB to be transmitted in the first occasion (e.g., the occasion of the on-demand SSB resources occurring during the cell DTX time). On the other hand, in aspects in which the indication indicates that the UE 120 is not permitted to request the on-demand SSB to be transmitted during the cell DTX inactive time, the network node 110 may refrain from monitoring the monitoring occasion for the request for the first instance of the on-demand SSB to be transmitted in the first occasion.

As indicated by reference number 640, the network node 110 may selectively transmit, and the UE 120 may selectively receive, the first instance of the on-demand SSB using the first occasion of the on-demand SSB resources (e.g., the on-demand SSB resources that occur during the cell DTX inactive time). For example, in aspects in which the indication as to whether the UE is permitted to request the on-demand SSB to be transmitted during the cell DTX inactive time indicates that the UE is permitted to request the on-demand SSB to be transmitted during the cell DTX inactive time, and in which the UE 120 transmits the request for the first instance of the on-demand SSB to be transmitted in the first occasion, the network node 110 may transmit, and the UE 120 may receive, the first instance of the on-demand SSB in the first occasion (e.g., the occasion occurring during the cell DTX inactive time indicated by reference number 637).

As described above in connection with reference number 630, in some aspects the configuration information may configure a UL-WUS monitoring occasion for use by the UE 120 to transmit a UL-WUS and/or a request for an on-demand SSB that is to be transmitted during the cell DTX inactive time. For example, the network node 110 may configure a UL-WUS for use by the UE 120 by indicating a time offset (e.g., time offset 625), shown in FIG. 6B by reference number 650, between the resources associated with the UL-WUS monitoring occasion and a start of the cell DTX inactive time and/or the first occasion. In such aspects, the request for the first instance of the on-demand SSB to be transmitted in the first occasion may be transmitted, by the UE 120, using the resources associated with the UL-WUS monitoring occasion. Moreover, in some aspects, the UL-WUS may be mapped to the first occasion, as described above. Put another way, the UE 120 may be configured with a one-to-one mapping between on-demand SSB resources in the cell DTX inactive time and the UL-WUS monitoring occasion in the cell DTX active time. In such aspects, the network node 110 may identify that the on-demand SSB is to be transmitted in the first occasion (e.g., the occasion occurring during the cell DTX inactive time indicated by reference number 637) based on the UE 120 transmitting the request in the UL-WUS monitoring occasion.

In some other aspects, the UE 120 may indicate (e.g., via the request for the on-demand SSB to be transmitted) that the on-demand SSB is to be transmitted in the first occasion (e.g., the occasion associated with the cell DTX inactive time). For example, in some aspects, the request for the on-demand SSB (e.g., the request described above in connection with reference number 640) may include a bitmap indicating that the UE 120 is requesting the first instance of the on-demand SSB to be transmitted in the first occasion. For example, the request for the on-demand SSB may include a bitmap that is similar to an SSB position in burst bitmap (sometimes referred to as SSB-PositionsInBurst) that indicates which of multiple candidate on-demand SSB resource occasions is to be used to transmit the on-demand SSB. In some other aspects, the request for the on-demand SSB (e.g., the request described above in connection with reference number 640) may include a one-bit indicator indicating that the UE 120 is requesting the first instance of the on-demand SSB to be transmitted in the first occasion. For example, the request for the on-demand SSB may include a one-bit indicator for which one of "0" or "1" indicates that an on-demand SSB is not requested during the cell DTX inactive time and for which the other one of "0" or "1" indicates that an on-demand SSB is requested during the cell DTX inactive time. In such aspects, in response to receiving one or more requests for the on-demand SSB to be transmitted during the cell DTX inactive time, the network node 110 may select one of multiple on-demand SSB resource occasions that occur during the cell DTX inactive time for transmitting the on-demand SSB. For example, in aspects in which the network node 110 receives multiple requests for an on-demand SSB from multiple UEs, the network node 110 may select an on-demand SSB resource occasion that is common to multiple UEs for transmitting the on-demand SSB, thereby reducing overhead otherwise associated with transmitting multiple on-demand SSBs to multiple UEs.

As described above in connection with FIG. 6A, in some aspects the network node 110 may transmit an on-demand SSB during a cell DTX active time even absent a request for the on-demand SSB to be transmitted, while, in some other aspects, the network node 110 may only transmit an on-demand SSB during a cell DTX active time if the on-demand SSB is requested by the UE 120. In aspects in which the network node 110 may only transmit the on-demand SSB during the cell DTX active time if the on-demand SSB is requested by the UE 120, the UE 120 may transmit, and the network node 110 may receive, a request for a second instance of the on-demand SSB to be transmitted in the second occasion (e.g., the on-demand SSB resource occasion occurring during the cell DTX active time), as indicated by reference number 655.

Additionally, or alternatively, as indicated by reference number 660, the network node 110 may transmit, and the UE 120 may receive, a second instance of the on-demand SSB in the second occasion. In aspects in which the network node 110 may transmit the on-demand SSBs during the cell DTX active time even absent a request for the on-demand SSB to be transmitted, the UE 120 may receive the second instance of the on-demand SSB in the second occasion without transmitting the request for the on-demand SSB to be transmitted in the second occasion. On the other hand, in aspects in which the network node 110 may only transmit an on-demand SSB during a cell DTX active time if the on-demand SSB is requested by the UE 120, the UE 120 may receive the second instance of the on-demand SSB in the second occasion based at least in part on transmitting the request for the second instance of the on-demand SSB described above in connection with reference number 655.

Additionally, or alternatively, as described above in connection with FIG. 6A, in aspects in which the network node 110 transmits, and the UE 120 receives, the first instance of the on-demand SSB in the first occasion and the second instance of the on-demand SSB in the second occasion, one or more parameters of the first instance of the on-demand SSB may differ from one or more parameters of the second instance of the on-demand SSB. For example, a TDRA associated with the first occasion may differ from a TDRA associated with the second occasion, a periodicity associated with the first occasion may differ from a periodicity associated with the second occasion, a structure of the first instance of the on-demand SSB may differ from a structure of the second instance of the on-demand SSB, a transmit power level associated with the first instance of the on-demand SSB may differ from a transmit power level associated with the second instance of the on-demand SSB, and/or a number of supported beams per burst associated with the first occasion may differ from a number of supported beams per burst associated with the second occasion.

Based at least in part on the network node 110 indicating to the UE 120 whether the UE 120 is permitted to request an on-demand SSB during a cell DTX inactive time, the UE 120 and/or the network node 110 may conserve computing, power, network, and/or communication resources that may have otherwise been consumed using traditional on-demand SSB procedures. For example, based at least in part on the network node 110 indicating to the UE 120 whether the UE 120 is permitted to request an on-demand SSB during a cell DTX inactive time, the UE 120 and the network node 110 may communicate with more robust communication channels and/or a reduced error rate, which may conserve computing, power, network, and/or communication resources that may have otherwise been consumed to detect and/or correct communication errors.

As indicated above, FIGS. 6A-6B are provided as an example. Other examples may differ from what is described with respect to FIGS. 6A-6B.

FIG. 7 is a diagram illustrating an example process 700 performed, for example, at a UE or an apparatus of a UE, in accordance with the present disclosure. Example process 700 is an example where the apparatus or the UE (e.g., UE 120) performs operations associated with techniques for selective transmission of an on-demand SSB during a cell DTX inactive time.

As shown in FIG. 7, in some aspects, process 700 may include receiving configuration information that configures resources associated with an on-demand SSB, wherein the resources associated with the on-demand SSB include a first occasion occurring during a cell DTX inactive time and a second occasion occurring during a cell DTX active time (block 710). For example, the UE (e.g., using reception component 902 and/or communication manager 906, depicted in FIG. 9) may receive configuration information that configures resources associated with an on-demand SSB, wherein the resources associated with the on-demand SSB include a first occasion occurring during a cell DTX inactive time and a second occasion occurring during a cell DTX active time, as described above.

As further shown in FIG. 7, in some aspects, process 700 may include receiving an indication as to whether the UE is permitted to request the on-demand SSB to be transmitted during the cell DTX inactive time (block 720). For example, the UE (e.g., using reception component 902 and/or communication manager 906, depicted in FIG. 9) may receive an indication as to whether the UE is permitted to request the on-demand SSB to be transmitted during the cell DTX inactive time, as described above.

As further shown in FIG. 7, in some aspects, process 700 may include performing, based at least in part on the indication as to whether the UE is permitted to request the on-demand SSB to be transmitted during the cell DTX inactive time, one of: transmitting a request for a first instance of the on-demand SSB to be transmitted in the first occasion, or refraining from transmitting the request for the first instance of the on-demand SSB to be transmitted in the first occasion (block 730). For example, the UE (e.g., using communication manager 906, depicted in FIG. 9) may perform, based at least in part on the indication as to whether the UE is permitted to request the on-demand SSB to be transmitted during the cell DTX inactive time, one of: transmitting a request for a first instance of the on-demand SSB to be transmitted in the first occasion, or refraining from transmitting the request for the first instance of the on-demand SSB to be transmitted in the first occasion, as described above.

Process 700 may include additional aspects, such as any single aspect or any combination of aspects described below and/or in connection with one or more other processes described elsewhere herein.

In a first aspect, process 700 includes receiving a second instance of the on-demand SSB in the second occasion without transmitting a request for the on-demand SSB to be transmitted in the second occasion.

In a second aspect, alone or in combination with the first aspect, process 700 includes transmitting a request for a second instance of the on-demand SSB to be transmitted in the second occasion, and receiving the second instance of the on-demand SSB in the second occasion.

In a third aspect, alone or in combination with one or more of the first and second aspects, the indication as to whether the UE is permitted to request the on-demand SSB to be transmitted during the cell DTX inactive time indicates that the UE is permitted to request the on-demand SSB to be transmitted during the cell DTX inactive time, performing one of transmitting the request for the first instance of the on-demand SSB to be transmitted in the first occasion, or refraining from transmitting the request for the first instance of the on-demand SSB to be transmitted in the first occasion, includes transmitting the request for the first instance of the on-demand SSB to be transmitted in the first occasion, and process 700 further comprises receiving the first instance of the on-demand SSB in the first occasion.

In a fourth aspect, alone or in combination with one or more of the first through third aspects, transmitting the request for the first instance of the on-demand SSB to be transmitted in the first occasion includes transmitting the request for the first instance of the on-demand SSB to be transmitted in the first occasion during the cell DTX active time.

In a fifth aspect, alone or in combination with one or more of the first through fourth aspects, the configuration information further configures resources associated with a UL-WUS monitoring occasion, and transmitting the request for the first instance of the on-demand SSB to be transmitted in the first occasion includes transmitting the request for the first instance of the on-demand SSB using the resources associated with the UL-WUS monitoring occasion.

In a sixth aspect, alone or in combination with one or more of the first through fifth aspects, the configuration information indicates the resources associated with the UL-WUS monitoring occasion by indicating a time offset between the resources associated with the UL-WUS monitoring occasion and one of a start of the cell DTX inactive time or the first occasion.

In a seventh aspect, alone or in combination with one or more of the first through sixth aspects, the configuration information indicates that the resources associated with the UL-WUS monitoring occasion are mapped to the first occasion.

In an eighth aspect, alone or in combination with one or more of the first through seventh aspects, transmitting the request for the first instance of the on-demand SSB to be transmitted in the first occasion includes transmitting a bitmap indicating that the UE is requesting the first instance of the on-demand SSB to be transmitted in the first occasion.

In a ninth aspect, alone or in combination with one or more of the first through eighth aspects, transmitting the request for the first instance of the on-demand SSB to be transmitted in the first occasion includes transmitting a one-bit indicator indicating that the UE is requesting the first instance of the on-demand SSB to be transmitted in the first occasion.

In a tenth aspect, alone or in combination with one or more of the first through ninth aspects, process 700 includes receiving the first instance of the on-demand SSB in the first occasion, and receiving a second instance of the on-demand SSB in the second occasion, wherein at least one of a TDRA associated with the first occasion differs from a TDRA associated with the second occasion, a periodicity associated with the first occasion differs from a periodicity associated with the second occasion, a structure of the first instance of the on-demand SSB differs from a structure of the second instance of the on-demand SSB, a transmit power level associated with the first instance of the on-demand SSB differs from a transmit power level associated with the second instance of the on-demand SSB, or a number of supported beams per burst associated with the first occasion differs from a number of supported beams per burst associated with the second occasion.

In an eleventh aspect, alone or in combination with one or more of the first through tenth aspects, the indication as to whether the UE is permitted to request the on-demand SSB to be transmitted during the cell DTX inactive time is received via one of an MIB, an SIB, an RRC communication, a MAC-CE, or a DCI communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, at a network node or an apparatus of a network node, in accordance with the present disclosure. Example process 800 is an example where the apparatus or the network node (e.g., network node 110) performs operations associated with techniques for selective transmission of an on-demand SSB during a cell DTX inactive time.

As shown in FIG. 8, in some aspects, process 800 may include transmitting, to a UE, configuration information that configures resources associated with an on-demand SSB, wherein the resources associated with the on-demand SSB include a first occasion occurring during a cell DTX inactive time and a second occasion occurring during a cell DTX active time (block 810). For example, the network node (e.g., using transmission component 1004 and/or communication manager 1006, depicted in FIG. 10) may transmit, to a UE, configuration information that configures resources associated with an on-demand SSB, wherein the resources associated with the on-demand SSB include a first occasion occurring during a cell DTX inactive time and a second occasion occurring during a cell DTX active time, as described above.

As further shown in FIG. 8, in some aspects, process 800 may include transmitting, to the UE, an indication as to whether the UE is permitted to request the on-demand SSB to be transmitted during the cell DTX inactive time (block 820). For example, the network node (e.g., using transmission component 1004 and/or communication manager 1006, depicted in FIG. 10) may transmit, to the UE, an indication as to whether the UE is permitted to request the on-demand SSB to be transmitted during the cell DTX inactive time, as described above.

As further shown in FIG. 8, in some aspects, process 800 may include performing, based at least in part on the indication as to whether the UE is permitted to request the on-demand SSB to be transmitted during the cell DTX inactive time, one of: monitoring a monitoring occasion for a request for a first instance of the on-demand SSB to be transmitted in the first occasion, or refraining from monitoring the monitoring occasion for the request for the first instance of the on-demand SSB to be transmitted in the first occasion (block 830). For example, the network node (e.g., using communication manager 1006, depicted in FIG. 10) may perform, based at least in part on the indication as to whether the UE is permitted to request the on-demand SSB to be transmitted during the cell DTX inactive time, one of: monitoring a monitoring occasion for a request for a first instance of the on-demand SSB to be transmitted in the first occasion, or refraining from monitoring the monitoring occasion for the request for the first instance of the on-demand SSB to be transmitted in the first occasion, as described above.

Process 800 may include additional aspects, such as any single aspect or any combination of aspects described below and/or in connection with one or more other processes described elsewhere herein.

In a first aspect, process 800 includes transmitting, to the UE, a second instance of the on-demand SSB in the second occasion without receiving a request for the on-demand SSB to be transmitted in the second occasion.

In a second aspect, alone or in combination with the first aspect, process 800 includes receiving, from the UE, a request for a second instance of the on-demand SSB to be transmitted in the second occasion, and transmitting, to the UE, the second instance of the on-demand SSB in the second occasion.

In a third aspect, alone or in combination with one or more of the first and second aspects, the indication as to whether the UE is permitted to request the on-demand SSB to be transmitted during the cell DTX inactive time indicates that the UE is permitted to request the on-demand SSB to be transmitted during the cell DTX inactive time, and the process 800 further comprises receiving, from the UE, the request for the first instance of the on-demand SSB to be transmitted in the first occasion, and transmitting, to the UE, the first instance of the on-demand SSB in the first occasion.

In a fourth aspect, alone or in combination with one or more of the first through third aspects, receiving the request for the first instance of the on-demand SSB to be transmitted in the first occasion includes receiving the request for the first instance of the on-demand SSB to be transmitted in the first occasion during the cell DTX active time.

In a fifth aspect, alone or in combination with one or more of the first through fourth aspects, the monitoring occasion includes resources associated with a UL-WUS monitoring occasion, and receiving the request for the first instance of the on-demand SSB to be transmitted in the first occasion includes receiving the request for the first instance of the on-demand SSB using the resources associated with the UL-WUS monitoring occasion.

In a sixth aspect, alone or in combination with one or more of the first through fifth aspects, the configuration information further indicates the resources associated with the UL-WUS monitoring occasion by indicating a time offset between the resources associated with the UL-WUS monitoring occasion and one of a start of the cell DTX inactive time or the first occasion.

In a seventh aspect, alone or in combination with one or more of the first through sixth aspects, the configuration information further indicates that the resources associated with the UL-WUS monitoring occasion are mapped to the first occasion.

In an eighth aspect, alone or in combination with one or more of the first through seventh aspects, receiving the request for the first instance of the on-demand SSB to be transmitted in the first occasion includes receiving, from the UE, a bitmap indicating that the UE is requesting the first instance of the on-demand SSB to be transmitted in the first occasion.

In a ninth aspect, alone or in combination with one or more of the first through eighth aspects, receiving the request for the first instance of the on-demand SSB to be transmitted in the first occasion includes receiving, from the UE, a one-bit indicator indicating that the UE is requesting the first instance of the on-demand SSB to be transmitted in the first occasion.

In a tenth aspect, alone or in combination with one or more of the first through ninth aspects, process 800 includes transmitting, to the UE, the first instance of the on-demand SSB in the first occasion, and transmitting, to the UE, a second instance of the on-demand SSB in the second occasion, wherein at least one of a TDRA associated with the first occasion differs from a TDRA associated with the second occasion, a periodicity associated with the first occasion differs from a periodicity associated with the second occasion, a structure of the first instance of the on-demand SSB differs from a structure of the second instance of the on-demand SSB, a transmit power level associated with the first instance of the on-demand SSB differs from a transmit power level associated with the second instance of the on-demand SSB, or a number of supported beams per burst associated with the first occasion differs from a number of supported beams per burst associated with the second occasion.

In an eleventh aspect, alone or in combination with one or more of the first through tenth aspects, the indication as to whether the UE is permitted to request the on-demand SSB to be transmitted during the cell DTX inactive time is transmitted via one of an MIB, an SIB, an RRC communication, a MAC-CE, or a DCI communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
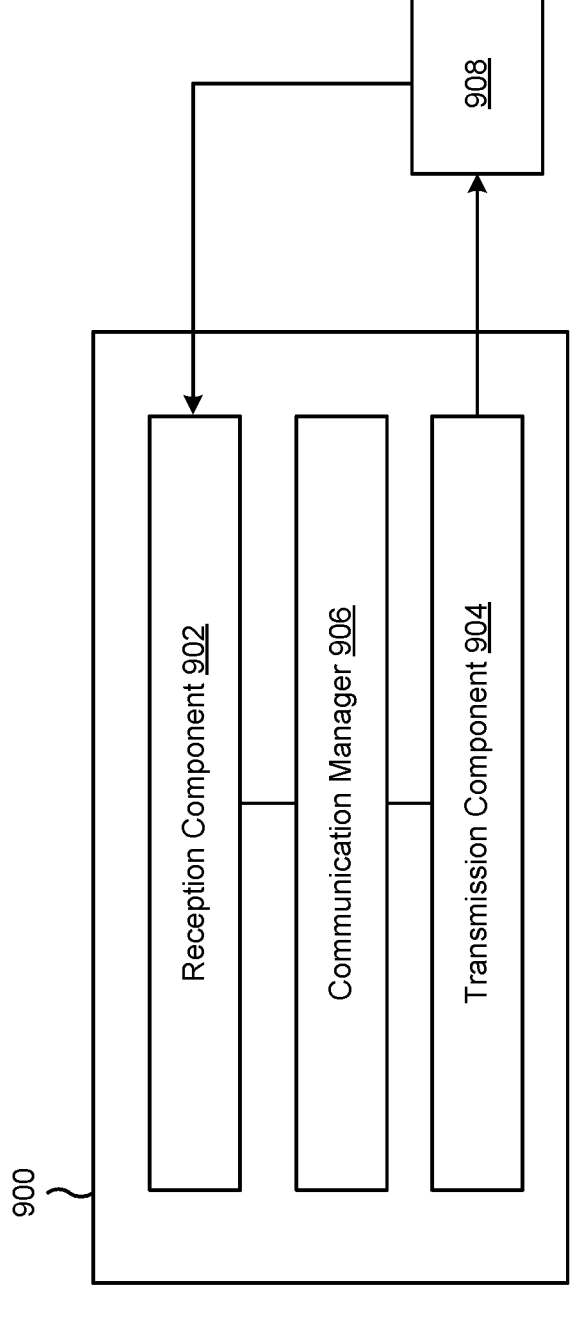
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 6A-6B. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE 120 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the UE 120 described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the UE 120 described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive configuration information that configures resources associated with an on-demand SSB, wherein the resources associated with the on-demand SSB include a first occasion occurring during a cell DTX inactive time and a second occasion occurring during a cell DTX active time. The reception component 902 may receive an indication as to whether the UE is permitted to request the on-demand SSB to be transmitted during the cell DTX inactive time. The communication manager 906 may perform, based at least in part on the indication as to whether the UE is permitted to request the on-demand SSB to be transmitted during the cell DTX inactive time, one of transmitting a request for a first instance of the on-demand SSB to be transmitted in the first occasion, or refraining from transmitting the request for the first instance of the on-demand SSB to be transmitted in the first occasion.

The reception component 902 may receive a second instance of the on-demand SSB in the second occasion without transmitting a request for the on-demand SSB to be transmitted in the second occasion.

The transmission component 904 may transmit a request for a second instance of the on-demand SSB to be transmitted in the second occasion.

The reception component 902 may receive the second instance of the on-demand SSB in the second occasion.

The reception component 902 may receive the first instance of the on-demand SSB in the first occasion.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
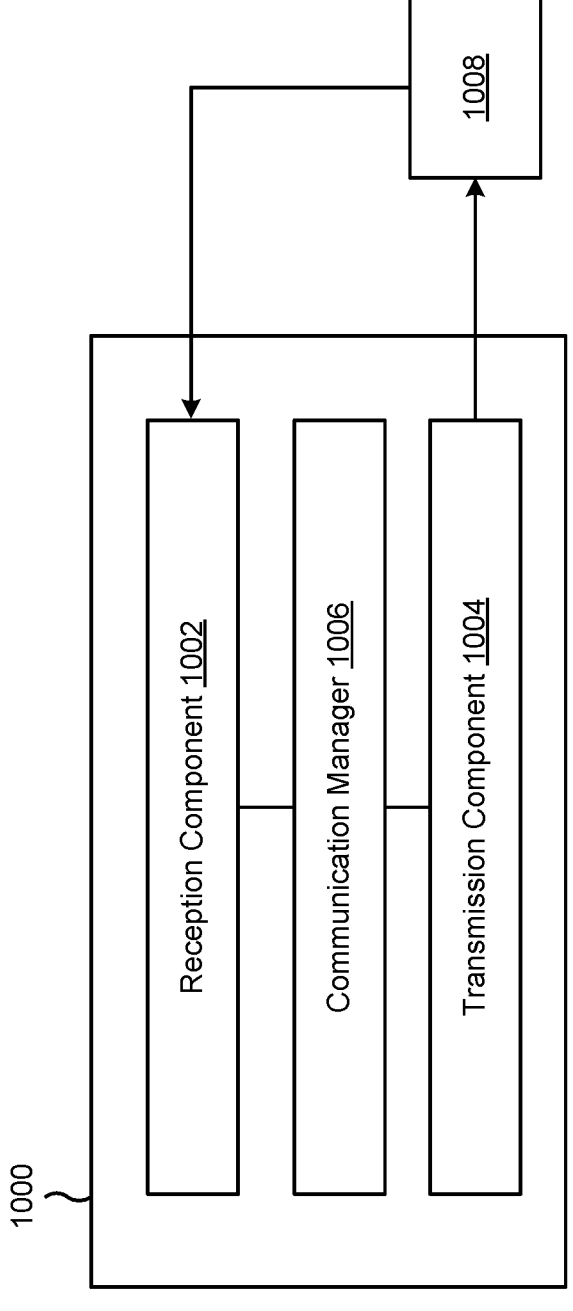
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 6A-6B. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node 110 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the network node 110 described in connection with include 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the network node 110 described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit, to a UE, configuration information that configures resources associated with an on-demand SSB, wherein the resources associated with the on-demand SSB include a first occasion occurring during a cell DTX inactive time and a second occasion occurring during a cell DTX active time. The transmission component 1004 may transmit, to the UE, an indication as to whether the UE is permitted to request the on-demand SSB to be transmitted during the cell DTX inactive time. The communication manager 1006 may perform, based at least in part on the indication as to whether the UE is permitted to request the on-demand SSB to be transmitted during the cell DTX inactive time, one of monitoring a monitoring occasion for a request for a first instance of the on-demand SSB to be transmitted in the first occasion, or refraining from monitoring the monitoring occasion for the request for the first instance of the on-demand SSB to be transmitted in the first occasion.

The transmission component 1004 may transmit, to the UE, a second instance of the on-demand SSB in the second occasion without receiving a request for the on-demand SSB to be transmitted in the second occasion.

The reception component 1002 may receive, from the UE, a request for a second instance of the on-demand SSB to be transmitted in the second occasion.

The transmission component 1004 may transmit, to the UE, the second instance of the on-demand SSB in the second occasion.

The transmission component 1004 may transmit, to the UE, the first instance of the on-demand SSB in the first occasion.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving configuration information that configures resources associated with an on-demand synchronization signal block (SSB), wherein the resources associated with the on-demand SSB include a first occasion occurring during a cell discontinuous transmission (DTX) inactive time and a second occasion occurring during a cell DTX active time; receiving an indication as to whether the UE is permitted to request the on-demand SSB to be transmitted during the cell DTX inactive time; and performing, based at least in part on the indication as to whether the UE is permitted to request the on-demand SSB to be transmitted during the cell DTX inactive time, one of: transmitting a request for a first instance of the on-demand SSB to be transmitted in the first occasion, or refraining from transmitting the request for the first instance of the on-demand SSB to be transmitted in the first occasion.

Aspect 2: The method of Aspect 1, further comprising receiving a second instance of the on-demand SSB in the second occasion without transmitting a request for the on-demand SSB to be transmitted in the second occasion.

Aspect 3: The method of any of Aspects 1-2, further comprising: transmitting a request for a second instance of the on-demand SSB to be transmitted in the second occasion; and receiving the second instance of the on-demand SSB in the second occasion.

Aspect 4: The method of any of Aspects 1-3, wherein the indication as to whether the UE is permitted to request the on-demand SSB to be transmitted during the cell DTX inactive time indicates that the UE is permitted to request the on-demand SSB to be transmitted during the cell DTX inactive time, wherein performing one of transmitting the request for the first instance of the on-demand SSB to be transmitted in the first occasion, or refraining from transmitting the request for the first instance of the on-demand SSB to be transmitted in the first occasion, includes transmitting the request for the first instance of the on-demand SSB to be transmitted in the first occasion, and wherein the method further comprises receiving the first instance of the on-demand SSB in the first occasion.

Aspect 5: The method of Aspect 4, wherein transmitting the request for the first instance of the on-demand SSB to be transmitted in the first occasion includes transmitting the request for the first instance of the on-demand SSB to be transmitted in the first occasion during the cell DTX active time.

Aspect 6: The method of Aspect 4, wherein the configuration information further configures resources associated with an uplink wakeup signal (UL-WUS) monitoring occasion, and wherein transmitting the request for the first instance of the on-demand SSB to be transmitted in the first occasion includes transmitting the request for the first instance of the on-demand SSB using the resources associated with the UL-WUS monitoring occasion.

Aspect 7: The method of Aspect 6, wherein the configuration information indicates the resources associated with the UL-WUS monitoring occasion by indicating a time offset between the resources associated with the UL-WUS monitoring occasion and one of a start of the cell DTX inactive time or the first occasion.

Aspect 8: The method of Aspect 6, wherein the configuration information indicates that the resources associated with the UL-WUS monitoring occasion are mapped to the first occasion.

Aspect 9: The method of Aspect 4, wherein transmitting the request for the first instance of the on-demand SSB to be transmitted in the first occasion includes transmitting a bitmap indicating that the UE is requesting the first instance of the on-demand SSB to be transmitted in the first occasion.

Aspect 10: The method of Aspect 4, wherein transmitting the request for the first instance of the on-demand SSB to be transmitted in the first occasion includes transmitting a one-bit indicator indicating that the UE is requesting the first instance of the on-demand SSB to be transmitted in the first occasion.

Aspect 11: The method of any of Aspects 1-10, further comprising: receiving the first instance of the on-demand SSB in the first occasion; and receiving a second instance of the on-demand SSB in the second occasion, wherein at least one of: a time domain resource allocation (TDRA) associated with the first occasion differs from a TDRA associated with the second occasion, a periodicity associated with the first occasion differs from a periodicity associated with the second occasion, a structure of the first instance of the on-demand SSB differs from a structure of the second instance of the on-demand SSB, a transmit power level associated with the first instance of the on-demand SSB differs from a transmit power level associated with the second instance of the on-demand SSB, or a number of supported beams per burst associated with the first occasion differs from a number of supported beams per burst associated with the second occasion.

Aspect 12: The method of any of Aspects 1-11, wherein the indication as to whether the UE is permitted to request the on-demand SSB to be transmitted during the cell DTX inactive time is received via one of: a master information block, a system information block, a radio resource control communication, a medium access control control element, or a downlink control information communication.

Aspect 13: A method of wireless communication performed by a network node, comprising: transmitting, to a user equipment (UE), configuration information that configures resources associated with an on-demand synchronization signal block (SSB), wherein the resources associated with the on-demand SSB include a first occasion occurring during a cell discontinuous transmission (DTX) inactive time and a second occasion occurring during a cell DTX active time; transmitting, to the UE, an indication as to whether the UE is permitted to request the on-demand SSB to be transmitted during the cell DTX inactive time; and performing, based at least in part on the indication as to whether the UE is permitted to request the on-demand SSB to be transmitted during the cell DTX inactive time, one of: monitoring a monitoring occasion for a request for a first instance of the on-demand SSB to be transmitted in the first occasion, or refraining from monitoring the monitoring occasion for the request for the first instance of the on-demand SSB to be transmitted in the first occasion.

Aspect 14: The method of Aspect 13, further comprising transmitting, to the UE, a second instance of the on-demand SSB in the second occasion without receiving a request for the on-demand SSB to be transmitted in the second occasion.

Aspect 15: The method of any of Aspects 13-14, further comprising: receiving, from the UE, a request for a second instance of the on-demand SSB to be transmitted in the second occasion; and transmitting, to the UE, the second instance of the on-demand SSB in the second occasion.

Aspect 16: The method of any of Aspects 13-15, wherein the indication as to whether the UE is permitted to request the on-demand SSB to be transmitted during the cell DTX inactive time indicates that the UE is permitted to request the on-demand SSB to be transmitted during the cell DTX inactive time, and wherein the method further comprises: receiving, from the UE, the request for the first instance of the on-demand SSB to be transmitted in the first occasion; and transmitting, to the UE, the first instance of the on-demand SSB in the first occasion.

Aspect 17: The method of Aspect 16, wherein receiving the request for the first instance of the on-demand SSB to be transmitted in the first occasion includes receiving the request for the first instance of the on-demand SSB to be transmitted in the first occasion during the cell DTX active time.

Aspect 18: The method of Aspect 16, wherein the monitoring occasion includes resources associated with an uplink wakeup signal (UL-WUS) monitoring occasion, and wherein receiving the request for the first instance of the on-demand SSB to be transmitted in the first occasion includes receiving the request for the first instance of the on-demand SSB using the resources associated with the UL-WUS monitoring occasion.

Aspect 19: The method of Aspect 18, wherein the configuration information further indicates the resources associated with the UL-WUS monitoring occasion by indicating a time offset between the resources associated with the UL-WUS monitoring occasion and one of a start of the cell DTX inactive time or the first occasion.

Aspect 20: The method of Aspect 18, wherein the configuration information further indicates that the resources associated with the UL-WUS monitoring occasion are mapped to the first occasion.

Aspect 21: The method of Aspect 16, wherein receiving the request for the first instance of the on-demand SSB to be transmitted in the first occasion includes receiving, from the UE, a bitmap indicating that the UE is requesting the first instance of the on-demand SSB to be transmitted in the first occasion.

Aspect 22: The method of Aspect 16, wherein receiving the request for the first instance of the on-demand SSB to be transmitted in the first occasion includes receiving, from the UE, a one-bit indicator indicating that the UE is requesting the first instance of the on-demand SSB to be transmitted in the first occasion.

Aspect 23: The method of any of Aspects 13-22, further comprising: transmitting, to the UE, the first instance of the on-demand SSB in the first occasion; and transmitting, to the UE, a second instance of the on-demand SSB in the second occasion, wherein at least one of: a time domain resource allocation (TDRA) associated with the first occasion differs from a TDRA associated with the second occasion, a periodicity associated with the first occasion differs from a periodicity associated with the second occasion, a structure of the first instance of the on-demand SSB differs from a structure of the second instance of the on-demand SSB, a transmit power level associated with the first instance of the on-demand SSB differs from a transmit power level associated with the second instance of the on-demand SSB, or a number of supported beams per burst associated with the first occasion differs from a number of supported beams per burst associated with the second occasion.

Aspect 24: The method of any of Aspects 13-23, wherein the indication as to whether the UE is permitted to request the on-demand SSB to be transmitted during the cell DTX inactive time is transmitted via one of: a master information block, a system information block, a radio resource control communication, a medium access control control element, or a downlink control information communication.

Aspect 25: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-24.

Aspect 26: An apparatus for wireless communication at a device, the apparatus comprising one or more memories and one or more processors coupled to the one or more memories, the one or more processors configured to cause the device to perform the method of one or more of Aspects 1-24.

Aspect 27: An apparatus for wireless communication, the apparatus comprising at least one means for performing the method of one or more of Aspects 1-24.

Aspect 28: A non-transitory computer-readable medium storing code for wireless communication, the code comprising instructions executable by one or more processors to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

Aspect 30: A device for wireless communication, the device comprising a processing system that includes one or more processors and one or more memories coupled with the one or more processors, the processing system configured to cause the device to perform the method of one or more of Aspects 1-24.

Aspect 31: An apparatus for wireless communication at a device, the apparatus comprising one or more memories and one or more processors coupled to the one or more memories, the one or more processors individually or collectively configured to cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein May be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. An apparatus for wireless communication at a user equipment (UE), comprising:
one or more memories; and
one or more processors coupled to the one or more memories, the one or more processors individually or collectively configured to cause the UE to:
receive configuration information that configures resources associated with an on-demand synchronization signal block (SSB), wherein the resources associated with the on-demand SSB include a first occasion occurring during a cell discontinuous transmission (DTX) inactive time and a second occasion occurring during a cell DTX active time;
receive an indication as to whether the UE is permitted to request the on-demand SSB to be transmitted during the cell DTX inactive time; and
perform, based at least in part on the indication as to whether the UE is permitted to request the on-demand SSB to be transmitted during the cell DTX inactive time, one of:
transmitting a request for a first instance of the on-demand SSB to be transmitted in the first occasion, or
refrain from transmitting the request for the first instance of the on-demand SSB to be transmitted in the first occasion.

2. The apparatus of claim 1, wherein the one or more processors are further configured to cause the UE to receive a second instance of the on-demand SSB in the second occasion without transmitting a request for the on-demand SSB to be transmitted in the second occasion.

3. The apparatus of claim 1, wherein the one or more processors are further configured to cause the UE to:
transmit a request for a second instance of the on-demand SSB to be transmitted in the second occasion; and
receive the second instance of the on-demand SSB in the second occasion.

4. The apparatus of claim 1, wherein the indication as to whether the UE is permitted to request the on-demand SSB to be transmitted during the cell DTX inactive time indicates that the UE is permitted to request on-demand SSB to be transmitted during the cell DTX inactive time, wherein the one or more processors, to cause the UE to perform one of transmitting the request for the first instance of the on-demand SSB to be transmitted in the first occasion, or refraining from transmitting the request for the first instance of the on-demand SSB to be transmitted in the first occasion, are configured to cause the UE to transmit the request for the first instance of the on-demand SSB to be transmitted in the first occasion, and wherein the one or more processors are further configured to cause the UE to receive the first instance of the on-demand SSB in the first occasion.

5. The apparatus of claim 4, wherein the one or more processors, to cause the UE to transmit the request for the first instance of the on-demand SSB to be transmitted in the first occasion, are configured to cause the UE to transmit the request for the first instance of the on-demand SSB to be transmitted in the first occasion during the cell DTX active time.

6. The apparatus of claim 4, wherein the configuration information further configures resources associated with an uplink wakeup signal (UL-WUS) monitoring occasion, and
wherein the one or more processors, to cause the UE to transmit the request for the first instance of the on-demand SSB to be transmitted in the first occasion, are configured to cause the UE to transmit the request for the first instance of the on-demand SSB using the resources associated with the UL-WUS monitoring occasion.

7. The apparatus of claim 6, wherein the configuration information indicates the resources associated with the UL-WUS monitoring occasion by indicating a time offset between the resources associated with the UL-WUS monitoring occasion and one of a start of the cell DTX inactive time or the first occasion.

8. The apparatus of claim 6, wherein the configuration information indicates that the resources associated with the UL-WUS monitoring occasion are mapped to the first occasion.

9. The apparatus of claim 4, wherein the one or more processors, to cause the UE to transmit the request for the first instance of the on-demand SSB to be transmitted in the first occasion, are configured to cause the UE to transmit a bitmap indicating that the UE is requesting the first instance of the on-demand SSB to be transmitted in the first occasion.

10. The apparatus of claim 4, wherein the one or more processors, to cause the UE to transmit the request for the first instance of the on-demand SSB to be transmitted in the first occasion, are configured to cause the UE to transmit a one-bit indicator indicating that the UE is requesting the first instance of the on-demand SSB to be transmitted in the first occasion.

11. The apparatus of claim 1, wherein the one or more processors are further configured to cause the UE to:
receive the first instance of the on-demand SSB in the first occasion; and
receive a second instance of the on-demand SSB in the second occasion,
wherein at least one of:
a time domain resource allocation (TDRA) associated with the first occasion differs from a TDRA associated with the second occasion,
a periodicity associated with the first occasion differs from a periodicity associated with the second occasion, a structure of the first instance of the on-demand SSB differs from a structure of the second instance of the on-demand SSB, a transmit power level associated with the first instance of the on-demand SSB differs from a transmit power level associated with the second instance of the on-demand SSB, or a number of supported beams per burst associated with the first occasion differs from a number of supported beams per burst associated with the second occasion.

12. The apparatus of claim 1, wherein the one or more processors, to cause the UE to receive the indication as to whether the UE is permitted to request the on-demand SSB to be transmitted during the cell DTX inactive time, are configured to cause the UE to receive the indication as to whether the UE is permitted to request the on-demand SSB to be transmitted during the cell DTX inactive time via one of:

a master information block, a system information block, a radio resource control communication, a medium access control control element, or a downlink control information communication.

13. An apparatus for wireless communication at a network node, comprising:

one or more memories; and one or more processors, coupled to the one or more memories, configured to cause the network node to:

transmit, to a user equipment (UE), configuration information that configures resources associated with an on-demand synchronization signal block (SSB), wherein the resources associated with the on-demand SSB include a first occasion occurring during a cell discontinuous transmission (DTX) inactive time and a second occasion occurring during a cell DTX active time;

transmit, to the UE, an indication as to whether the UE is permitted to request the on-demand SSB to be transmitted during the cell DTX inactive time; and perform, based at least in part on the indication as to whether the UE is permitted to request the on-demand SSB to be transmitted during the cell DTX inactive time, one of:

monitoring a monitoring occasion for a request for a first instance of the on-demand SSB to be transmitted in the first occasion, or refrain from monitoring the monitoring occasion for the request for the first instance of the on-demand SSB to be transmitted in the first occasion.

14. The apparatus of claim 13, wherein the one or more processors are further configured to cause the network node to transmit, to the UE, a second instance of the on-demand SSB in the second occasion without receiving a request for the on-demand SSB to be transmitted in the second occasion.

15. The apparatus of claim 13, wherein the one or more processors are further configured to cause the network node to:

receive, from the UE, a request for a second instance of the on-demand SSB to be transmitted in the second occasion; and transmit, to the UE, the second instance of the on-demand SSB in the second occasion.

16. The apparatus of claim 13, wherein the indication as to whether the UE is permitted to request the on-demand SSB to be transmitted during the cell DTX inactive time indicates that the UE is permitted to request the on-demand SSB to be transmitted during the cell DTX inactive time, and wherein the one or more processors are further configured to cause the network node to:

receive, from the UE, the request for the first instance of the on-demand SSB to be transmitted in the first occasion; and transmit, to the UE, the first instance of the on-demand SSB in the first occasion.

17. The apparatus of claim 16, wherein the one or more processors, to cause the network node to receive the request for the first instance of the on-demand SSB to be transmitted in the first occasion, are configured to cause the network node to receive the request for the first instance of the on-demand SSB to be transmitted in the first occasion during the cell DTX active time.

18. The apparatus of claim 16, wherein the monitoring occasion includes resources associated with an uplink wakeup signal (UL-WUS) monitoring occasion, and wherein the one or more processors, to cause the network node to receive the request for the first instance of the on-demand SSB to be transmitted in the first occasion, are configured to cause the network node to receive the request for the first instance of the on-demand SSB using the resources associated with the UL-WUS monitoring occasion.

19. The apparatus of claim 18, wherein the configuration information further indicates the resources associated with the UL-WUS monitoring occasion by indicating a time offset between the resources associated with the UL-WUS monitoring occasion and one of a start of the cell DTX inactive time or the first occasion.

20. A method of wireless communication performed by a user equipment (UE), comprising:

receiving configuration information that configures resources associated with an on-demand synchronization signal block (SSB), wherein the resources associated with the on-demand SSB include a first occasion occurring during a cell discontinuous transmission (DTX) inactive time and a second occasion occurring during a cell DTX active time;

receiving an indication as to whether the UE is permitted to request the on-demand SSB to be transmitted during the cell DTX inactive time; and performing, based at least in part on the indication as to whether the UE is permitted to request the on-demand SSB to be transmitted during the cell DTX inactive time, one of:

transmitting a request for a first instance of the on-demand SSB to be transmitted in the first occasion, or refraining from transmitting the request for the first instance of the on-demand SSB to be transmitted in the first occasion.

* * * * *